US010805253B2

(12) United States Patent
Barnett et al.

(10) Patent No.: US 10,805,253 B2
(45) Date of Patent: Oct. 13, 2020

(54) SYSTEMS AND METHODS TO TRANSITION BETWEEN MEDIA CONTENT ITEMS

(71) Applicant: Facebook, Inc., Menlo Park, CA (US)

(72) Inventors: John Samuel Barnett, Newark, CA (US); Johannes Peter Kopf, Seattle, WA (US)

(73) Assignee: Facebook, Inc., Menlo Park, CA (US)

( * ) Notice: Subject to any disclaimer, the term of this patent is extended or adjusted under 35 U.S.C. 154(b) by 48 days.

(21) Appl. No.: 15/396,392

(22) Filed: Dec. 30, 2016

(65) Prior Publication Data

US 2018/0189283 A1    Jul. 5, 2018

(51) Int. Cl.
| G06F 15/16 | (2006.01) |
| H04L 12/58 | (2006.01) |
| G06F 3/01 | (2006.01) |
| H04N 21/84 | (2011.01) |
| H04N 21/45 | (2011.01) |
| H04N 21/4725 | (2011.01) |
| G06F 16/435 | (2019.01) |
| G06Q 50/00 | (2012.01) |

(52) U.S. Cl.
CPC .............. *H04L 51/32* (2013.01); *G06F 3/011* (2013.01); *G06F 16/435* (2019.01); *G06Q 50/01* (2013.01); *H04N 21/4532* (2013.01); *H04N 21/4725* (2013.01); *H04N 21/84* (2013.01)

(58) Field of Classification Search
CPC .. G06F 17/30038; G06F 17/30; G06F 3/0482; G06F 3/04842; H04L 65/4084; H04L 51/32; H04L 29/06; H04L 12/58
See application file for complete search history.

(56) References Cited

U.S. PATENT DOCUMENTS

| 9,298,778 B2* | 3/2016 | Evans | G06F 3/0484 |
| 2008/0065992 A1* | 3/2008 | Ma | H04N 7/163 715/720 |
| 2009/0119261 A1* | 5/2009 | Ismalon | G06F 17/3064 |
| 2009/0282336 A1* | 11/2009 | Lindley | G06F 17/30038 715/716 |
| 2011/0202848 A1* | 8/2011 | Ismalon | G06F 17/3089 715/738 |
| 2011/0231426 A1* | 9/2011 | Fejta | G11B 27/038 707/769 |
| 2013/0290818 A1* | 10/2013 | Arrasvuori | H04N 21/4383 715/201 |
| 2014/0164138 A1* | 6/2014 | Jayaram | G06Q 30/0269 705/14.66 |
| 2018/0102106 A1* | 4/2018 | Shintani | G09G 5/10 |

* cited by examiner

*Primary Examiner* — Cheikh T Ndiaye
(74) *Attorney, Agent, or Firm* — Sheppard Mullin Richter & Hampton LLP

(57) ABSTRACT

Systems, methods, and non-transitory computer readable media are configured to detect a concept reflected in a first media content item to which a user is provided access. It is determined that the concept has a threshold level of relevance to the user. The concept is associated with an element that upon selection causes a transition to a second media content item to which the user is provided access, the second media content item reflecting the concept. The element is presented in the first media content item for the user.

20 Claims, 16 Drawing Sheets

Transition Matching Module 282

Orientation Module 284

Adaptation Module 286

Receive from a user a selection associated with a first media content item to cause a transition from the first media content item
452

Configure a transition between the first media content item and a second media content item
454

Present the transition for the user in response to the selection
456

FIGURE 4B

SYSTEMS AND METHODS TO TRANSITION BETWEEN MEDIA CONTENT ITEMS

FIELD OF THE INVENTION

The present technology relates to processing of media content items. More particularly, the present technology relates to techniques for managing transitions among media content items through a media content platform.

BACKGROUND

Users often utilize computing devices for a wide variety of purposes. Users can use their computing devices to, for example, interact with one another, access media content, share media content, and create media content. In some cases, media content can be provided by users of a social networking system. The media content can include one or a combination of, for example, text, images, videos, and audio. The media content may be published to the social networking system for consumption by others.

Under conventional approaches, media content provided through a social networking system can be accessed by users of the social networking system in various manners. In some cases, various media content can be provided to a member based on interests of the user as determined by the social networking system. For example, the various media content can be presented as a list of media content items from which the user can select one or more media content items. In other cases, various media content can be accessed by a user based on navigation by the user to pages and profiles of other users on the social networking system. The pages and profiles can present media content items available for selection and access by the user.

SUMMARY

Various embodiments of the present technology can include systems, methods, and non-transitory computer readable media configured to detect a concept reflected in a first media content item to which a user is provided access. It is determined that the concept has a threshold level of relevance to the user. The concept is associated with an element that upon selection causes a transition to a second media content item to which the user is provided access, the second media content item reflecting the concept. The element is presented in the first media content item for the user.

In an embodiment, a type of the first media content item is at least one of an image, video, virtual content, and audio content.

In an embodiment, a type of the second media content item is at least one of an image, video, virtual content, and audio content.

In an embodiment, the element can be selected through a gesture by the user.

In an embodiment, the element is positioned within a threshold distance from a position of the concept reflected in the first media content item.

In an embodiment, a motion trajectory of the concept is in the first media content item is detected. The element in the first media content item is positioned to follow the motion trajectory.

In an embodiment, the presenting the element in the first media content item is permitted by a provider of the first media content item.

In an embodiment, the transition to the second media content item is permitted by a provider of the second media content item.

In an embodiment, the element is a transition marker.

In an embodiment, a tag indicative of subject matter of the concept is presented within a threshold distance from a position of the concept reflected in the first media content item.

Various embodiments of the present technology can include systems, methods, and non-transitory computer readable media configured to receive from a user a selection associated with a first media content item to cause a transition from the first media content item. A transition between the first media content item and a second media content item is configured. The transition is presented for the user in response to the selection.

In an embodiment, the receipt from a user of a selection comprises receiving a selection of a transition marker associated with a concept reflected in the first media content item. A plurality of media content items are determined based on a tag associated with the concept. A media content item is selected from the plurality of media content items as the second media content item.

In an embodiment, a type of the first media content item is at least one of an image, video, virtual content, and audio content.

In an embodiment, a type of the second media content item is at least one of an image, video, virtual content, and audio content.

In an embodiment, the determining a plurality of media content items is further based on inclusion by each of the plurality of media content items of the tag associated with the concept.

In an embodiment, the selecting a media content item from the plurality of media content items comprises: scoring each of the plurality of media content items based on at least one of a degree of similarity between a tag associated with a media content item and the tag associated with the concept, a level of relevance of a tag associated with a media content item to interests of the user, whether a media content item is provided by a connection of the user on a social networking system, and a popularity of a media content item in the social networking system; and selecting the media content item from the plurality of media content items as the second media content item based on the scoring.

In an embodiment, each of the plurality of media content items is scored. A threshold number of highest scoring media content items of the plurality of media content items are presented to the user as candidates for the second media content item. A selection of the second media content item from the highest scoring media content items is received from the user.

In an embodiment, the transition is permitted by a provider of the second media content item.

In an embodiment, the second media content item provides a more immersive experience for the user than the first media content item.

In an embodiment, the first media content item is associated with a connection of the user and is presented at a profile or portal associated with the user. The transition includes presentation of the profile or portal associated with the user transitioning to presentation of a profile or portal associated with the connection.

Various embodiments of the present technology can include systems, methods, and non-transitory computer readable media configured to determine orientation data associated with a first media content item. A second media content item to which the first media content can transition is selected based on the orientation data. A transition from the first media content item to the second media content item is presented.

In an embodiment a type of the first media content item is at least one of an image, video, virtual content, and audio content.

In an embodiment, a type of the second media content item is at least one of an image, video, virtual content, and audio content.

In an embodiment, the orientation data associated with the first media content item includes at least one of an angle of a camera used to capture content, translational velocity of the camera, rotational velocity of the camera, and a user view angle with respect to a concept depicted in the first media content item.

In an embodiment, orientation data associated with the second media content item is the same as the orientation data associated with the first media content item.

In an embodiment, orientation data associated with the second media content item is within a threshold difference value of the orientation data associated with the first media content item.

In an embodiment, a plurality of media content items are scored based on an extent to which orientation data associated with each matches the orientation data associated with the first media content item.

In an embodiment, a media content item of the plurality of media content items with a highest score is selected as the second media content item.

In an embodiment, the presenting a transition from the first media content item to the second media content item comprises directing a user view at a concept depicted in the second media content item based on the orientation data associated with the first media content item.

In an embodiment, the presenting a transition from the first media content item to the second media content item comprises adjusting orientation data associated with the second media content item to be within a threshold difference value from the orientation data associated with the first media content item.

It should be appreciated that many other features, applications, embodiments, and/or variations of the disclosed technology will be apparent from the accompanying drawings and from the following detailed description. Additional and/or alternative implementations of the structures, systems, non-transitory computer readable media, and methods described herein can be employed without departing from the principles of the disclosed technology.

BRIEF DESCRIPTION OF THE DRAWINGS

FIG. 2C illustrates an example transition matching module, according to an embodiment of the present technology.

FIG. 4B illustrates an example method relating to content transitions, according to an embodiment of the present technology.

Figure 1:
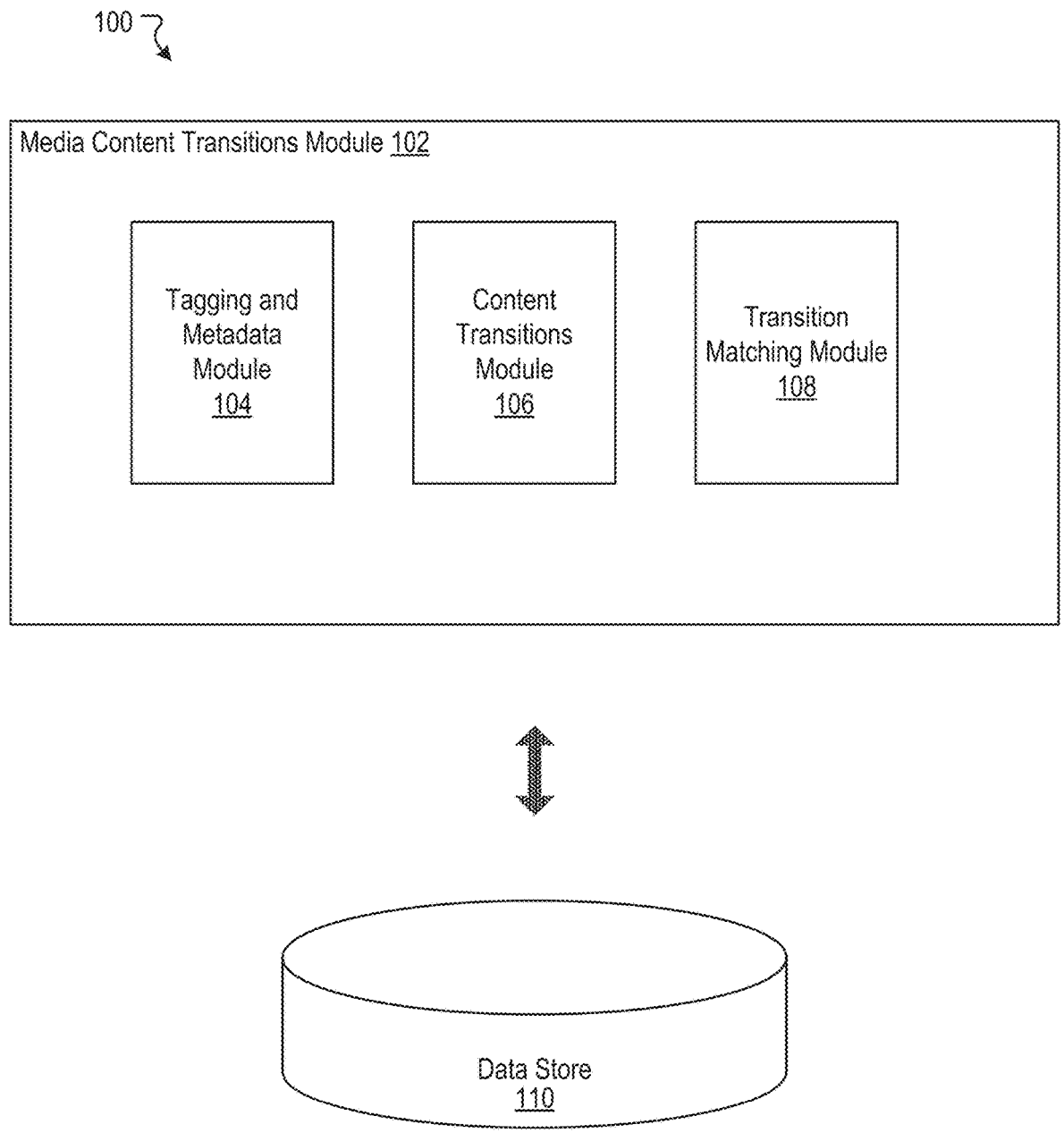
FIG. 1 illustrates a system including an example media content transitions module, according to an embodiment of the present technology.

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein.

DETAILED DESCRIPTION

Transitions for Media Content Items

As mentioned, users often utilize computing devices for a wide variety of purposes. Users can use their computing devices to, for example, interact with one another, access media content, share media content, and create media content. In some cases, media content can be provided by users of a social networking system. The media content can include one or a combination of, for example, text, images, videos, and audio. The media content may be published to the social networking system for consumption by others.

Under conventional approaches, media content provided through a social networking system can be accessed by users of the social networking system in various manners. For example, various media content can be provided to a member based on interests of the user as determined by the social networking system. The various media content can be presented as a list of media content items from which the user can select one or more media content items. As another example, various media content can be accessed by a user based on desired navigation by the user to pages and profiles of other users on the social networking system. The pages and profiles can present media content items available for selection and access by the user.

Management of access to media content items under conventional approaches can pose challenges for both users who desire access to media content items and content providers who provide media content items through the social networking system for access by users. With respect to users desiring access to media content items, conventional approaches can fail to provide access to a full or complete selection of media content items that may be of interest to a user. In some circumstances, a list of media content items that have been determined to be relevant to a user can be provided to the user for selection. However, if a user views a concept that is of interest to the user while accessing a media content item, the user is often unable to expeditiously and seamlessly explore other media content items that may be related to the concept. Accordingly, the experience of users seeking other media content items of interest can suffer in such circumstances. With respect to content providers of media content items, conventional approaches often deprive content providers the capability of optimizing user experience in relation to consumption of their media content items. In many instances, a content provider does not have the ability to configure its media content items to indicate to a user consuming the media content item that certain portions thereof are linked to other media content. Further, in many instances, the content provider does not have the ability to allow a user to seamlessly transition to the other linked media content while accessing the original media content item.

An improved approach rooted in computer technology overcomes the foregoing and other disadvantages associated with conventional approaches specifically arising in the realm of computer technology. Systems, methods, and computer readable media of the present technology can allow automatic identification of concepts, such as persons, objects, places, and topics, in a media content item. The identification of concepts can be performed by various recognition techniques, such as image recognition or video recognition. Identified concepts can be assigned elements (or references) presented in a media content item. Elements can include tags that are descriptive of the subject matter reflected by the concepts and associated with orientation data relating to the media content item, as well as transition markers allowing transitions to other media content items. In some instances, the tags and transition markers can appear in the media content item adjacent to their corresponding concepts. When a concept, such as an object, undergoes movement in a presentation of the media content item, such as a video, the associated tag and transition marker can follow a motion trajectory of the concept. In some instances, not all tags and transition markers associated with concepts reflected in the media content item are presented to the user. Rather, only tags and transition markers associated with selected concepts that have been determined to be of relevance to the user are presented in the media content item for the user. The transition markers in the media content item can be associated with transitions from the media content item to other media content items. The other media content items can reflect concepts that are the same as or similar to the concepts reflected in the original media content item. Upon selection of a transition marker by a user accessing the media content item, the user can transition (or "teleport", "tunnel", "jump", etc.) from the media content item to another media content item. To select the other media content item, contextual data such as orientation data associated with the original media content item is maintained to optimize user experience. In some cases, orientation data associated with a media content item can include camera orientation data and user view data. Orientation data associated with a media content item to which the user can transition can be adapted to match orientation data associated with an original media content. More details regarding the present technology are described herein.

FIG. 1 illustrates an example system 100 including an example media content transitions module 102 configured to selectively manage and control transitions involving media content, according to an embodiment of the present technology. The media content transitions module 102 can allow a user of a social networking system to transition (or "teleport", "tunnel", "jump", etc.) from a portion of a first media content item to a related portion of a second media content item. For example, a transition can link two media content items that depict a common object. The transition from the first media content item to the second media content item can occur while the user is accessing (or consuming) the first media content item. For example, the transition can occur before presentation (e.g., playback, live streaming, etc.) of the first media content item reaches an end point of the media content item. A transition between two media content items can be supported by elements (or references), such as tags and transition markers. A tag can be a recognized term in a social networking system that corresponds with a concept, such as a person, object, place, or topic. One or more concepts can be automatically detected in a first media content item. Upon detection, a tag descriptive of or otherwise corresponding to the concept can be presented in the media content item to indicate the presence of the concept. A transition marker associated with the concept and corresponding tag can be presented in the first media content item. The transition marker can indicate to the user an option to transition from the first media content item to another media content item based on the tag. A user may choose to transition from the first media content item to access more media content items relating to the concept associated with the tag. For example, a concept corresponding to a tag can be present in a first media content item and a second media content item. In this example, selection of a transition marker associated with the tag as presented in the first media content item can allow the user to automatically proceed to access the second media content item at a position where the tag appears in the second media content item. In this way, the user can be provided with additional media content items in accordance with her interests. The second media content item can be selected or adapted so that user experience for the user is optimized in proceeding from the first media content item. In some cases, contextual data, such as orientation data associated with the first media content item, can be used to select or adapt the second media content item to ensure a smooth transition.

A media content item in accordance with the present technology can be any type of media content item. Types of media content items can include an image (e.g., two dimensional (2D) image), a video (e.g., 2D videos), virtual content (e.g., panoramic photos, 360 photos, photo spheres, 360 videos, virtual reality (VR) environments), audio, or a combination thereof. The virtual content can be any content that captures 360 degree views and/or presents any three-dimensional (3D) content or environments. In one example, the virtual content can include a spherical video (or 360 video) that captures a 360 degree view of a scene. Some examples can include videos composed using monoscopic 360 degree views, videos composed using stereoscopic 180 degree views, etc. The spherical video can be created by stitching together various video streams, or feeds, that were captured by cameras that are placed at different locations and/or positions to capture a 360 degree view of the scene. Such video streams may be predetermined for various angles (e.g., 0 degree, 30 degrees, 60 degrees, etc.) of the spherical video. Once stitched together, a user can access the spherical video through a viewport to view a portion of the spherical video at some angle. The portion of the spherical video shown to the user can be determined based on the location and direction of the viewport in three-dimensional space. In another example, virtual content can include virtual reality (VR) content and environments. VR constitutes simulated environments presented through a viewport mounted within headgear or other equipment worn by a user. The simulated environments can be replications of actual places or fictional worlds that are presented via the equipment. A user has the ability to move freely in the simulated environment and to interact with it as desired. A user can interact with the simulated environment through commands provided to the equipment or user gestures detected by the equipment. Spherical videos are referenced herein for ease of illustration. However, the present technology can be adapted for any type of media content item supportive of an immersive user experience including, for example, half sphere videos (e.g., 180 degree videos), arbitrary partial sphere videos, 225 degree videos, 3D 360 videos, to name some examples. In various embodiments, the present technology described herein can be adapted for any media content item that partially or wholly encompasses (or surrounds) a viewer (or user). Moreover, such media content items need not be limited to, for example, videos that are formatted using a spherical shape but may also be applied to immersive media content items (e.g., videos) formatted using other shapes including, for example, cubes, pyramids, and other shape representations of a video recorded three dimensional world.

Various embodiments are discussed herein for purposes of illustration. A transition can be described herein in relation to access by a user of a first media content item that proceeds to a different second media content item. The present technology also encompasses transitions from a first portion (e.g., scene, space) of a media content item to a second portion (e.g., scene, space) of the same media content item. As another example, some transitions can be described in relation to a particular first type of media content item followed by a particular second type of media content item. The present technology encompasses transitions from any type of media content item to any type of media content item. To name some examples, a transition can include but is not limited to the following types of media content items: a 360 video that proceeds to a 360 video; a 360 video that proceeds to a VR environment; a VR environment that proceeds to a 360 video; a VR environment that proceeds to a VR environment; a 360 video that proceeds to an image; a VR environment that proceeds to an image; a 360 video that proceeds to audio content; a VR environment that proceeds to audio content; audio content that proceeds to a 360 video; audio content that proceeds to a VR environment; etc. Many variations are possible.

The media content transitions module 102 can include a tagging and metadata module 104, a content transitions module 106, and a transition matching module 108. The components (e.g., modules, elements, steps, blocks, etc.) shown in this figure and all figures herein are exemplary only, and other implementations may include additional, fewer, integrated, or different components. Some components may not be shown so as not to obscure relevant details. In various embodiments, one or more of the functionalities described in connection with the media content transitions module 102 can be implemented in any suitable combinations.

The tagging and metadata module 104 can allow automatic identification of concepts, such as persons, objects, places, and topics, in a media content item. The identification of concepts can be performed by various recognition techniques, such as image recognition, video recognition, audio recognition, etc. Identified concepts can be assigned tags descriptive of or identifying the subject matter reflected by the concepts. In some embodiments, tags also can be associated with orientation data. A tag and a transition marker to permit transition to a related media content item can be presented in a media content item adjacent to their corresponding concept. Functionality of the tagging and metadata module 104 is described in more detail herein.

The content transitions module 106 can perform a transition from a first media content item to a second media content item based on a tag. In some embodiments, a transition can be associated with a media content item as determined by a social networking system or a content provider responsible for uploading the media content item to the social networking system. A transition can be indicated to a user by a transition marker that appears in the first media content item adjacent to an associated concept. Upon selection of a transition marker by a user, the user can transition from the first media content item to the second media content item. One or more media content items can reflect a concept or orientation data that is the same as or similar to the concept or orientation data associated with the tag in the first media content item. The second media content item to which the user is transitioned can be selected from the one or more media content items based on various considerations. Functionality of the content transitions module 106 is described in more detail herein.

The transition matching module 108 can select or configure a transition from a first media content item to a second media content item to optimize user experience based on orientation data associated with the first media content item. The orientation data can include, for example, camera orientation and a user view. The second media content item can be selected based on a match between the orientation data associated with the first media content item and the orientation data associated with the second media content item. In some instances, orientation data associated with the second media content item can be adapted to match the orientation data associated with the first media content item. Functionality of the transition matching module 108 is described in more detail herein.

In some embodiments, the media content transitions module 102 can be implemented, in part or in whole, as software, hardware, or any combination thereof. In general, a module as discussed herein can be associated with software, hardware, or any combination thereof. In some implementations, one or more functions, tasks, and/or operations of modules can be carried out or performed by software routines, software processes, hardware, and/or any combination thereof. In some cases, the media content transitions module 102 can be, in part or in whole, implemented as software running on one or more computing devices or systems, such as on a server or a client computing device. For example, the media content transitions module 102 can be, in part or in whole, implemented within or configured to operate in conjunction or be integrated with a social networking system (or service), such as a social networking system 630 of FIG. 6. As another example, the media content transitions module 102 can be implemented as or within a dedicated application (e.g., app), a program, or an applet running on a user computing device or client computing system. In some instances, the media content transitions module 102 can be, in part or in whole, implemented within or configured to operate in conjunction or be integrated with client computing device, such as a user device 610 of FIG. 6. It should be understood that many variations are possible.

The system 100 can include a data store 110 configured to store and maintain various types of data, such as the data relating to support of and operation of the media content transitions module 102. The data store 110 also can maintain other information associated with a social networking system. The information associated with the social networking system can include data about users, social connections, social interactions, locations, geo-fenced areas, maps, places, events, groups, posts, communications, content, account settings, privacy settings, and a social graph. The social graph can reflect all entities of the social networking system and their interactions. As shown in the example system 100, the media content transitions module 102 can be configured to communicate and/or operate with the data store 110.

Figure 2A:
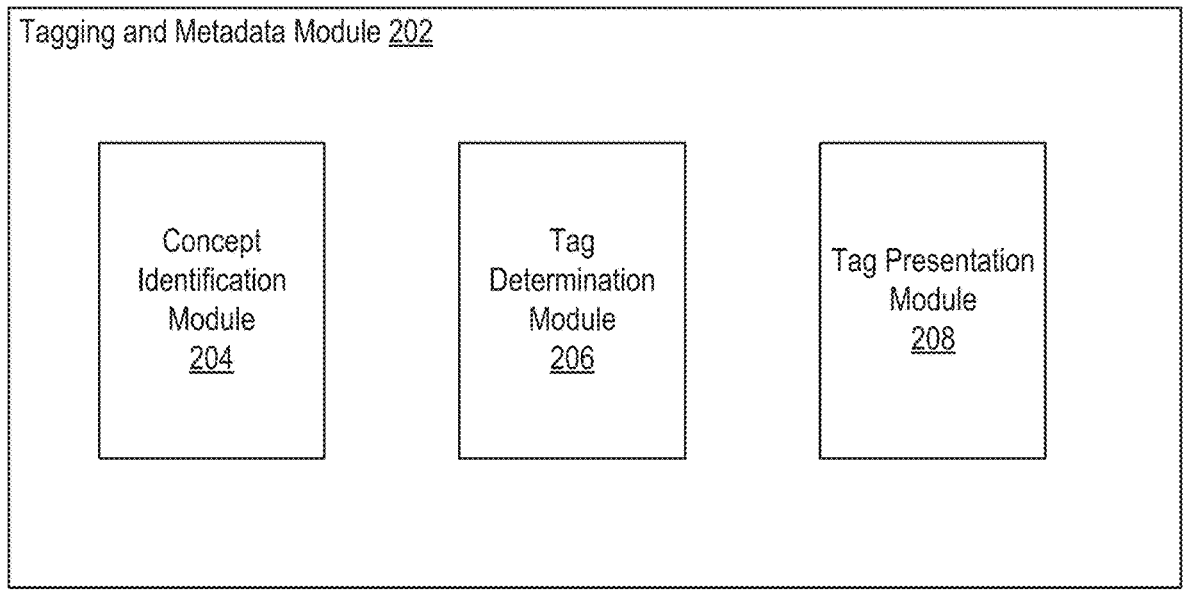
FIG. 2A illustrates an example tagging and metadata module, according to an embodiment of the present technology.

FIG. 2A illustrates an example tagging and metadata module 202, according to an embodiment of the present technology. In some embodiments, the tagging and metadata module 104 of FIG. 1 can be implemented with the tagging and metadata module 202. The tagging and metadata module 202 can include a concept identification module 204, a tag determination module 206, and a tag presentation module 208.

The concept identification module 204 can determine concepts reflected in media content items to which a user can be provided access. A concept can be anyone or anything that can be directly or indirectly reflected in, discerned from, or implicated by a media content item. Types of concepts can include, for example, persons, objects, places, topics, and time periods reflected in media content items. A media content item can reflect one or more types of concepts captured by or depicted in the media content item. For example, a person or an object can be depicted in or captured by a media content item presenting content relating to the person or the object. As another example, a place or a topic likewise can be depicted in or captured by a media content item presenting content relating to the place or the topic. Concepts reflected in media content items can be identified by conventional identification techniques. For example, a concept reflected in visual content, such as an image, 2D video, or virtual content, can be identified by conventional image or video recognition techniques. As another example, a concept reflect in audio content can be identified by conventional audio recognition techniques.

In some embodiments, the concept identification module 204 can identify concepts in media content items based at least in part on or facilitated by contextual data (or metadata) associated with the media content item. Contextual data can include, for example, time data and geo-location data associated with media content items. The time data can include times of capture or creation of media content items. Geo-location data can include geo-location data obtained by sensors or computing devices used to capture or create media content items. Such geo-location data can include, for example, GPS coordinate data and compass (directional) data. By considering contextual data associated with a media content item, the concept identification module 204 in some instances can provide a more accurate identification of a concept reflected in the media content item. For example, the concept identification module 204 can determine that a media content item reflects either a first object or a second object. In this example, by also accounting for a particular location corresponding to geo-location data associated with the media content item, the concept identification module 204 can determine that the second object is reflected in the media content item when the second object is known to occur with more frequency than the first object at the particular location. Likewise, the concept identification module 204 can apply time data in a similar manner to more accurately identify concepts reflected in media content items. Contextual data also can include, for example, information relating to social signals associated with a media content item. The social signals can include various information, such as identity (or profile) of a provider of the media content item, identities of users who have interacted with (e.g., fanned, commented on, shared, etc.) or viewed the media content item, comments posted regarding the media content item, etc. In some embodiments, the concept identification module 204 can be implemented by one or more machine learning models (or classifiers) that can be trained on features relating to content of the media content items as well as associated contextual data to identify concepts reflected in the media content items.

The tag determination module 206 can assign tags to concepts reflected in a media content item. The tags can identify or otherwise be indicative of subject matter of the concepts reflected in a media content item. For example, a concept detected in a media content item that relates to certain subject matter can be assigned a tag that denotes or indicates the subject matter. Tags can be text, graphics, logos, or any other indication of a concept. In some embodiments, tags associated with concepts can correspond to nodes in a graph representative of entities in a social networking system. In some cases, a node corresponding to a tag can be a page (or profile) on the social networking system that provides content related to subject matter of a concept associated with the tag. The tag determination module 206 can identify media content items reflecting the same or similar concepts based on assignment of the same tags for the media content items. In some embodiments, tags or their corresponding nodes in a graph of a social networking system can be organized in a variety of manners. For example, tags can be hierarchically organized or grouped into clusters based on meanings of their associated concepts. Through organization of tags, tags that are similar in meaning, or relate to subject matter that is similar in meaning within threshold levels of difference, can be determined.

In some embodiments, a tag relating to a media content item or a concept reflected therein also can be associated with orientation data. The orientation data can include camera orientation data and user view data. In some embodiments, the orientation data can include, for example, an angle of a camera used to capture content, translational velocity (speed, direction) of the camera, rotational velocity (speed, direction) of the camera, and a perspective (or view angle) of a user accessing the content. In addition to meaning similarity, tags can be determined that have similar orientation data. As discussed in more detail herein, a transition can be selected based on similarity in orientation data between media content items.

The tag presentation module 208 can present tags and associated transition markers in media content items. Transition markers are discussed in more detail herein. A tag and an associated transition marker can be positioned at locations in the media content item that are adjacent to a position of a concept associated with the tag or within a threshold distance of the position of the concept. For example, with respect to visual content, a tag and an associated transition marker can be overlaid in the visual content so that display of the tag and the associated transition marker are adjacent to a location of a concept associated with the tag. With respect to a media content item in which a concept exhibits relative motion or has a motion trajectory in the media content item, the tag presentation module 208 can determine the position of the concept in the media content item as the concept moves. For example, the tag presentation module 208 can apply an optical flow or other motion tracking technique to a media content item to determine the position and motion trajectory of concepts depicted therein. Based on the determined positions and motion trajectories of the depicted concepts in the media content item, a tag and a transition marker associated with each concept can be positioned in the media content item in a manner that follows the motion trajectory of the concept.

The tag presentation module 208 can selectively present tags and associated transition markers in media content items. In some embodiments, all concepts identified in a media content item can be assigned tags and transition markers for potential display in the media content item. A tag presented in a media content item can indicate or emphasize to a user accessing the media content item a concept associated with the tag. The transition maker can indicate to the user an ability or option to directly transition to other media content items reflecting the same or similar concepts. In some embodiments, both a tag and a transition marker associated with a concept can be presented to a user. In some embodiments, either a tag or a transition marker can be presented to the user as an element or reference. In some embodiments, an element or reference associated with a concept and presented to the user can function as both a tag that indicates the subject matter of the concept and a transition marker that indicates an ability to transition to another media content item.

Tags and their associated transition markers can be selectively employed and presented. In some embodiments, presentation of a tag or a transition marker in a media content item can be based on a permission by a provider of the media content item to allow such presentation. In some embodiments, a content provider associated with a media content item or a social networking system providing access to the media content item, or both, can determine which tags and transition markers out of all possible tags and transition markers can be displayed in the media content item. A determination of which tags and transition markers to display can be based on a variety of considerations. In some embodiments, tags and transition markers can be selected for potential display in the media content item based on the importance of associated concepts reflected in the media content item. In this regard, tags and transition markers corresponding to concepts having a threshold level of importance can be displayed. For example, a level of importance of a concept can be determined based on an amount of user interaction with a page on a social networking system associated with the concept, an amount of user interaction with (e.g., selection of) the tag or transition marker, etc. In some embodiments, tags and transition markers can be selected for display in the media content item based on their relevance to a user accessing the media content item. For instance, tags and transition markers relating to concepts that are deemed to have a threshold level of relevance to interests of a user can be displayed to the user. Tags and transitions markers relating to concepts that are not deemed to have the threshold level of relevance to interests of the user are not displayed to the user. A level of relevance to interests of a user can be determined based on a variety of considerations. Such considerations can include, for example, demographic information relating to the user, actions taken by the user on a social networking system, actions taken by connections of the user on the social networking system, etc. In some embodiments, tags and transition markers can be selected for display in the media content item based on factors relating to user experience. For instance, a threshold number of tags and transition markers can be determined to avoid display of an unduly large number of tags and transition markers and a potential appearance of clutter in visual content. In this regard, if a number of tags and transition markers for potential presentation in a scene (or space, media content item, etc.) is less than the threshold number of tags and transition markers, the number of tags and transition markers can be displayed. If the number of tags and transition markers exceeds the threshold number of tags and transition markers, the number of tags and transition markers exceeding the threshold are not displayed. Many variations are possible.

Figure 2B:
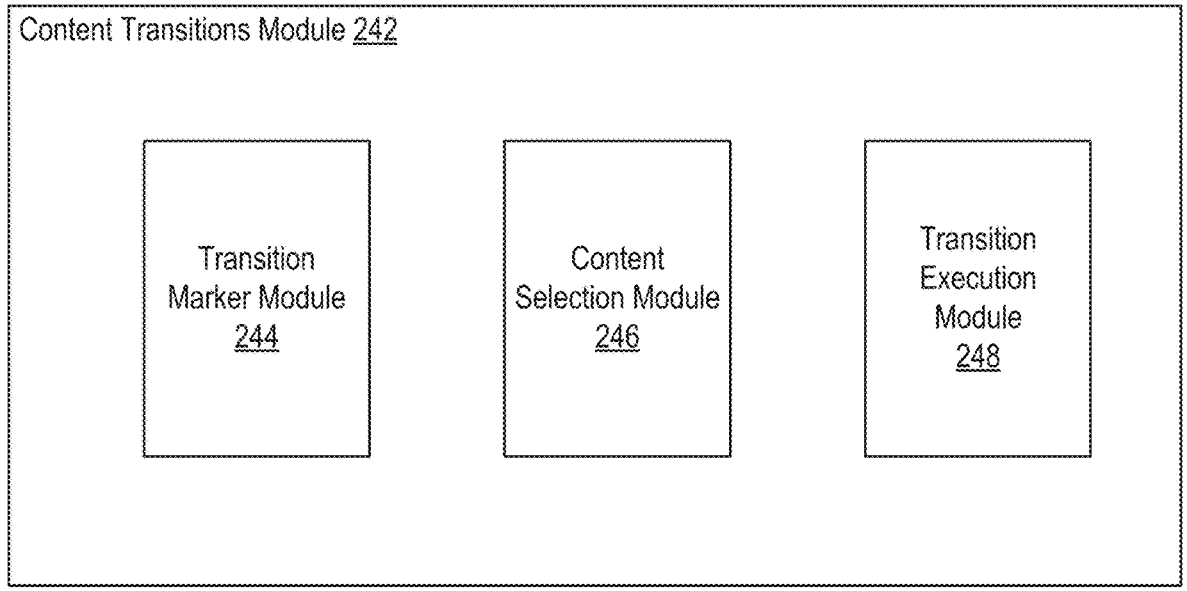
FIG. 2B illustrates an example content transitions module, according to an embodiment of the present technology.

FIG. 2B illustrates an example content transitions module 242, according to an embodiment of the present technology. In some embodiments, the content transitions module 106 of FIG. 1 can be implemented with the content transitions module 242. The content transitions module 242 can include a transition marker module 244, a content selection module 246, and a transition execution module 248.

The transition marker module 244 can present a transition marker in a media content item that allows a user accessing the media content item to transition to another media content item. A transition marker can be any reference or element that can indicate to a user the existence of a potential transition from a media content item to another media content item. Examples of a transition marker can include a light, a door, a point, a curtain, a window, a passage, a tunnel, a portal, etc. The transition marker can be associated with a tag selected for presentation in a media content item. In some embodiments, the transition marker can be positioned at a location in a media content item that is adjacent to, or within a threshold distance from, a position of an associated tag or concept in the media content item, as discussed.

A user accessing a media content item can be presented with a transition marker in the media content item to indicate an option to transition to another media content item based on a concept associated with the transition marker. The transition marker can be selected by the user through interaction with the transition marker in a variety of manners. As just one example, with respect to virtual content, the transition marker can be selected by an appropriate command or gesture provided by the user. In some instances, the command or gesture can include a gaze by the user at the transition marker as detected by headgear worn by the user in support of a VR environment, a step by the user in a direction of the transition marker in a VR environment, a hand gesture constituting a selection of the transition marker as detected by a sensors in a wearable device allowing interaction in a VR environment, a touch gesture to a touch screen, etc.

The content selection module 246 can identify a tag associated with a selected transition marker corresponding to a first media content item. Because each tag in a media content item is indicative of subject matter of a corresponding concept, the tags in media content items can be used to identify media content items that reflect the same or similar concepts and subject matter. Accordingly, the identified tag for the first media content item can be used to identify a set (or plurality) of media content items that reflect one or more concepts that are the same as or similar to the concept associated with the tag. The set of media content items constitute candidate media content items that the user may potentially proceed to access upon selection of the transition marker. In some embodiments, the set of media content items can be selected based on their inclusion of a tag that is the same as the tag associated with the selected transition marker. In some embodiments, the set of media content items can be selected based on their inclusion of a tag that is similar by a threshold amount to the tag associated with the selected transition marker. A degree of similarity between tags can be reflected through, for example, hierarchical organizations or categorizations to which the tags belong or cluster relationships of the tags. Because the set of media content items reflect a concept that is the same as or similar to a concept associated with a selected transition marker, user experience in relation to transition of a user to a media content item from the set of media content items can be optimized. In some embodiments, a tag associated with a selected transition marker relating to a first media content item and tags associated with a set of media content items also can contain or be associated with orientation data. Selection of the set of media content items in relation to the first media content item also can be based on similarity in orientation data between the first media content item and the set of media content items. In some instances, in addition to conceptual similarity, orientation data can be used to determine a second media content item from the set of media content items to which the first media content item can transition, as described in more detail herein.

The content selection module 246 can select a second media content item from the set of media content items for display to a user in a transition from a first media content item. As referenced, a transition can involve a first media content item of any type and a second media content item of any type. In some embodiments, the set of media content items can be scored based on a variety of considerations. The considerations can include, for example, the degree of similarity between tags of the first media content item and each media content item in the set, a level of relevance of a concept reflected by a tag of each media content item to interests of a user, whether a media content item in the set is provided by a connection of a user on a social networking system, popularity of each media content item in the set as determined by interactions of other users in a social networking system, etc. The set of media content items can be ranked based on their scores. In some embodiments, a threshold number of highest scoring media content items from the set can be presented to a user in a menu or list upon selection by the user of a transition marker reflected in the first media content item. A second media content item to which the user can transition can be selected by the user from the menu or the list. In some embodiments, a highest scoring media content item from the set can be presented to the user as the second media content item. In one example, the user can approve a transition involving the second media content item before presentation of the second media content item. In some embodiments, selection of a media content item as a second media content item can be based on a permission provided by a content provider of the media content item.

The transition execution module 248 can execute a transition between a first media content item and a second media content item to optimize user experience. The transition execution module 248 can create or configure a transition between the first media content item and the second media content item to avoid abrupt or discordant mergers of content or suboptimal user experience. Such configuration can include application of conventional image, video, audio, or haptic editing or modification techniques. For example, the transition execution module 248 can selectively apply filters to visual, audio, and haptic signals presented by a first media content item and a second media content item so that the signals are matched in value within threshold difference values to produce a smooth transition. For instance, the transition execution module 248 can selectively employ fading (or white out or black out) and amplification (e.g., zooming in or zooming out) of media content items, as appropriate, in a transition. In some embodiments, the transition execution module 248 can determine optimal transition points between two media content items at which to apply a transition. In some embodiments, the transition execution module 248 can apply a selected cut or transition between a first media content item and a second media content item. As just one example, a graphic match (or form) cut in which a transition is based on similarity in shape and size of an object depicted in a first media content item and an object depicted in a second media content item can be used to create a transition between the media content items. Other factors can be considered in the configuration or selection of a transition between media content items, as discussed in more detail herein.

The transition execution module 248 can configure transitions to have dynamic properties. In some embodiments, a transition to a second media content item is configured to allow a user to return to the first media content item. For example, while accessing a first media content item (e.g., virtual content), a user can select a transition marker that causes presentation of one or more second media content items (e.g., images). The one or more second media content items can be accessed by the user in a manner that allows the user to quickly and directly return to accessing the first media content item. For instance, the transition can be performed by presentation of the one or more second media content items through a secondary user interface element (e.g., modal window) that is subordinate to a primary user interface element through which the first media content item is presented. To return to the first media content item after accessing the one or more second media content items, the user can dismiss the second user interface element to resume access to the first media content item.

The content transitions module 242 can generate transitions (or teleportation, tunneling, jumping, etc.) between media content items, which include VR environments, in other manners with optional use of one or more of the transition marker module 244, the content selection module 246, and the transition execution module 248. In some embodiments, the content transitions module 242 can support transitions between media content items for a user in a VR environment. A user who is experiencing a VR environment can view a variety of media content items. When a user selects a media content item, the content transitions module 242 can execute a transition to a second media content item that is presented to the user in the VR environment. For example, a user can select a media content item by an appropriate user command or gesture, such as gazing at the media content item for a predetermined duration. In some embodiments, the second media content item can be an adaptation of the first media content item that, when presented to a user, provides a more immersive experience than the first media content item. For example, based on a user command or gesture selecting a first media content item, a second media content item adapted from a first media content item can be presented to a user as a 360 degree experience, such as a photo sphere or other virtual content that surrounds the user.

In some embodiments, a user can select a concept depicted in a VR environment. The selection can be performed by an appropriate user command or gesture, as indicated. In response to selection of the concept, a tag identifying or describing the concept can be presented adjacent to the concept. For example, if a person is depicted in a VR environment presented to a user and the user selects the person, a tag identifying the person can be presented in the VR environment to the user. In some embodiments, when a person presented in a VR environment is selected by a user, the user can be transitioned in a manner such that the user can be presented with a destination in the VR environment associated with the person, such as a location, resource, or other profile or portal in the VR environment dedicated for the person. The profile or portal of a user, such as the person, can include a collection of media content items associated with the user in the VR environment. In addition, the profile or portal can include information relating to a presence of the user in the VR environment and interactions of the user therein. For example, the profile or portal can include a listing of connections (e.g., friends) of the user in the VR environment and a collection of media content items associated with the user. In some cases, the listing of connections of the user can include a collection of avatars representing the connections. The collection of media content items can include media content items provided by the user, interacted with (e.g., liked, commented on, shared, etc.) by the user, provided by connections of the user, etc. In some embodiments, when a user accesses or views a profile or portal of the user, the user can select a first connection, or an avatar associated with the first connection, listed in the profile or portal of the user. The selection can be performed by an appropriate user command or gesture, as indicated. In response to selection of the first connection, the user can be transitioned so that the user is accessing or viewing a profile or portal of the first connection. When accessing or viewing the profile or portal of the first connection, a listing of connections of the first connection likewise can be presented to the user. If the user selects a second connection from the listing, the user can be likewise transitioned so that the user is accessing or viewing a profile or portal of the selected second connection. A series of transitions can be performed in this manner to allow a user to transition from one connection in one profile or portal to as many other connections in other profiles or portals as is desired.

FIG. 2C illustrates an example transition matching module 282, according to an embodiment of the present technology. In some embodiments, the transition matching module 108 of FIG. 1 can be implemented with the transition matching module 282. The transition matching module 282 can include an orientation module 284 and an adaptation module 286.

The orientation module 284 can obtain metadata and contextual data to assist in identification of a second media content item to which a first media content item can transition. In some embodiments, the metadata can include orientation data, which includes motion data, associated with media content items. The orientation data can include camera orientation data and user view data. In some embodiments, the orientation data can include an angle of a camera used to capture content, translational velocity (speed, direction) of the camera, rotational velocity (speed, direction) of the camera, and a perspective (or view angle) of a user accessing the content, to name some examples. In some embodiments, the orientation data can be determined or measured in relation to a concept reflected in a media content item that is viewed by a user. The orientation data can be determined based on sensor data acquired from orientation or position sensors associated with a camera or a computing device on which the camera is implemented (e.g., accelerometer, gyroscope, GPS device, etc.), or sensors that can detect a view angle (or gaze direction) of a user while consuming a media content item (e.g., headset, monitoring camera, etc.). The orientation data can be based on visual indicators in a media content item, such as a detected horizon line in a media content item or a directional compass determined in relation to the media content item. To optimize a transition, the orientation module 284 can select, or weight more heavily in selection of media content items, a media content item associated with orientation data that is similar to or within one or more threshold difference values of orientation data associated with a first media content item. Such a media content item can constitute a second media content item to which the first media content item can transition.

For example, assume a first media content item is captured with a camera or cameras having a particular translational velocity or a particular rotational velocity with respect to a concept reflected the first media content item. Selection by the user of a transition marker associated with the concept, in turn, can prompt selection of a suitable second media content item to which the user can transition. As discussed in more detail herein, one or more media content items that reflect a concept or associated tag that is the same as or similar to a concept or associated tag reflected in a first media content item can be identified as candidates to constitute a second media content item. In this example, the orientation module 284 in some instances also can select, weight, or prioritize one or more media content items associated with the same camera translational velocity or rotational velocity with respect to the reflected concept for selection as the second media content item. In some instances, one or more media content items associated with camera translational velocities or rotational velocities with respect to the reflected concept that are within threshold difference values of, respectively, the camera translational velocity and the rotational velocity associated with the first media content item can be potentially selected as the second media content item. In some embodiments, a sequence of media content items can be linked as a chain of media content items such that each pair of media content items connected by a transition has the same or similar orientation data. In some embodiments, each media content item can be scored and ranked as a potential second media content item based at least in part on the extent to which its associated orientation data matches orientation data associated with a first media content item. In some instances, a highest ranking media content item can be selected as the second media content item to which the first media content item can transition. In some instances, a threshold number of lowest ranking media content items can be discarded from consideration as a potential second media content item even if they otherwise reflect concepts that are the same or similar to a concept in a first media content item. In this manner, certain media content items can be eliminated from consideration in a transition based on their levels of discordance with the first media content item even when they reflect subject matter in common with the first media content item.

The adaptation module 286 can adapt a user view of a media content item to optimize a transition between media content items. In some embodiments, the adaptation module 286 can adjust orientation data of a first media content item or a second media content item so that their respective orientation data are equal or within a threshold difference value from one another. For example, assume that a user view in relation to a concept reflected in a first media content item is based on a particular angle, translational velocity, or rotational velocity when the user selects a transition marker corresponding to the concept. To optimize a transition to a second media content item, the adaptation module 286 can set presentation of the second media content item to the user so that, during the transition, the user view in relation to the concept reflected in the second media content item is automatically based on the particular angle, translational velocity, or rotational velocity, or within threshold difference values therefrom. In some embodiments, the adaptation module 286 can select a user view for a user accessing a second media content item based on orientation data that is predetermined by a provider of the second media content item. For example, a user can be presented with a particular user view of a second media content item based on predetermined orientation data even if the particular user view is discordant with a user view of a user in relation to a first media content item prior to a transition to the second media content item.

The adaptation module 286 can modify orientation data associated with media content items to optimize transitions. In some embodiments, orientation data associated with a second media content item can be modified or adjusted to match orientation data associated with a first media content item to optimize a transition. For example, assume that a camera rotational velocity associated with a first media content item is a particular value. Assume further that another media content item has been selected as a potential second media content item based on a common tag reflected in the media content items. Assume still further that the potential second media content item is associated with a camera rotational velocity that is different from the camera rotational velocity associated with the first media content item. The adaptation module 286 can process and edit the second media content item so that the rotational velocity associated with the potential second media content item is equal to or within a threshold difference value from the camera rotational velocity associated with the first media content item. For example, the adaptation module 286 can adjust a number of frames of and otherwise modify the second media content item to alter the rotational velocity of the second media content item.

With respect to the orientation module 284 and the adaptation module 296, the threshold difference values can be adjustable to set an allowable amount of deviation in orientation data as between a first media content item and a second media content item. The allowable amount of deviation in orientation data can relate to a desired amount of smoothness in a transition from a first media content item to a second media content item. In various embodiments, the threshold difference values can be selected or adjusted by a user accessing the media content items, a provider of the first media content item, a provider of the second media content item, or an administrator of a social networking system through which media content items are accessed.

Figure 3A:
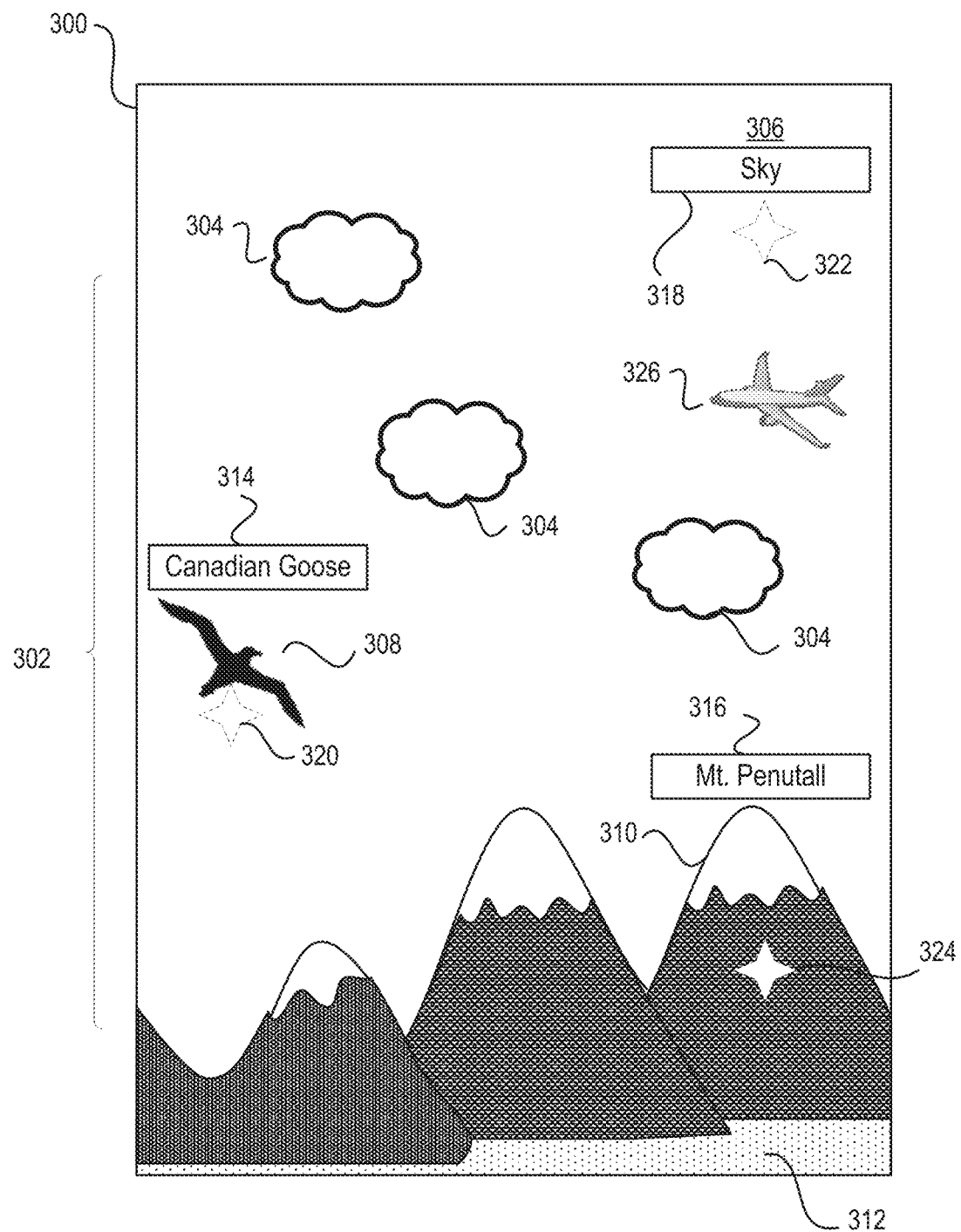
FIGS. 3A-3G illustrate example scenarios, according to an embodiment of the present technology.

FIG. 3A illustrates a first example scenario, according to an embodiment of the present technology. The scenario involves a user interface 300 for presenting a first media content item 302 to a user. The user interface 300 can be presented to a user through a suitable display. The display can be supported by a computing device or equipment that can present one or more media content item types. Although not shown, the user interface 300 can also provide audio content, haptic content, and other forms of content to the user. The first media content item 302 can be any suitable type of media content item, such as virtual content (e.g., a 360 video). In other examples, other types of media content items can be presented. The first media content item 302 can be analyzed by the media content transitions module 102 to identify concepts depicted therein. Based on various recognition techniques, concepts reflected in the first media content item 302 are identified. As shown, clouds 304, a sky 306, a Canadian goose 308, a mountain 310, an ocean 312, and an airplane 326 are concepts detected in the first media content item 302. Based on interests of the user as determined by a social networking system, concepts of potential interest to the user are indicated by tags and corresponding transition markers. In particular, a tag 314 appears adjacent to (or within a threshold distance from) the Canadian goose 308; a tag 316 appears adjacent to the mountain 310; and a tag 318 appears adjacent to the sky 306. Tags and associated transition markers for the clouds 304 and the airplane 326 do not appear in the first media content item 302 because their corresponding concepts have been determined to lack a threshold level of relevance for the user.

Transition markers associated with detected concepts of relevance to the user appear in the first media content item 302. As shown, a transition marker 320 appears adjacent to the Canadian goose 308; a transition marker 322 is overlaid on the sky 306; and a transition marker 324 is overlaid on the mountain 310. Each transition marker conveys to the user that a transition to a second media content item based on the associated concept can be selected. For example, selection of the transition marker 320 associated with the concept of the Canadian goose 308 can trigger a transition that allows the user to access a second media content item also reflecting the concept of the Canadian goose 308. As another example, selection of the transition marker 324 associated with the concept of the mountain 310 can trigger a transition that allows the user to access a second media content item also reflecting the concept of the mountain 310. The user can select a transition marker by provision of an appropriate user command or gesture, such as gazing at a transition marker for a predetermined amount of time or otherwise applying an appropriate control through equipment supportive of user interaction in the virtual content. Although each transition marker is depicted in the manner shown, it will be appreciated that other forms and representations of transition markers are possible. In some embodiments not illustrated, tags and transitions markers can be integrated into single references or elements. In various embodiments not illustrated, tags or transitions markers, or both, are not presented. For example, a transition to a second media content item can be executed based on selection by a user of the concept itself.

Figure 3B:
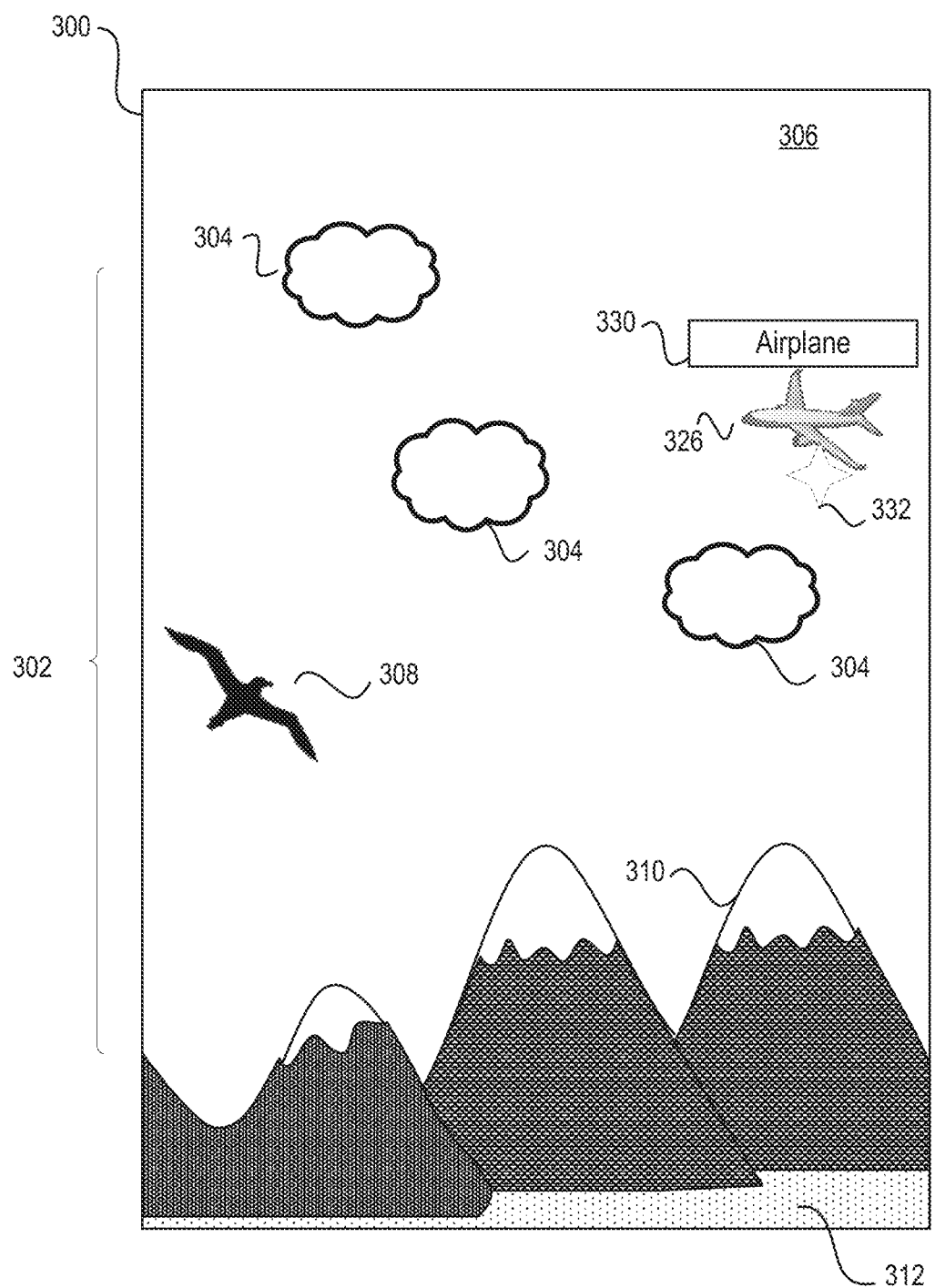

FIG. 3B illustrates a second example scenario, according to an embodiment of the present technology. In this scenario, a second user, who is different from the user described in FIG. 3A, is presented with the first media content item 302. The first media content item 302 can be analyzed by the media content transitions module 102 to identify concepts depicted therein. Based on various recognition techniques, concepts reflected in the first media content item 302 are identified. As shown, the clouds 304, the sky 306, the Canadian goose 308, the mountain 310, the ocean 312, and the airplane 326 are concepts detected in the first media content item 302. Based on interests of the second user as determined by a social networking system, concepts of potential interest to the second user are indicated by tags and corresponding transition markers. In particular, a tag 330 and a transition marker 332 appear adjacent to (or within a threshold distance from) the airplane 326. Tags and associated transition markers for the clouds 304, the sky 306, the Canadian goose 308, the mountain 310, and the ocean 312 do not appear in the first media content item 302 because their corresponding concepts have been determined to lack a threshold level of relevance for the second user.

Figure 3C:
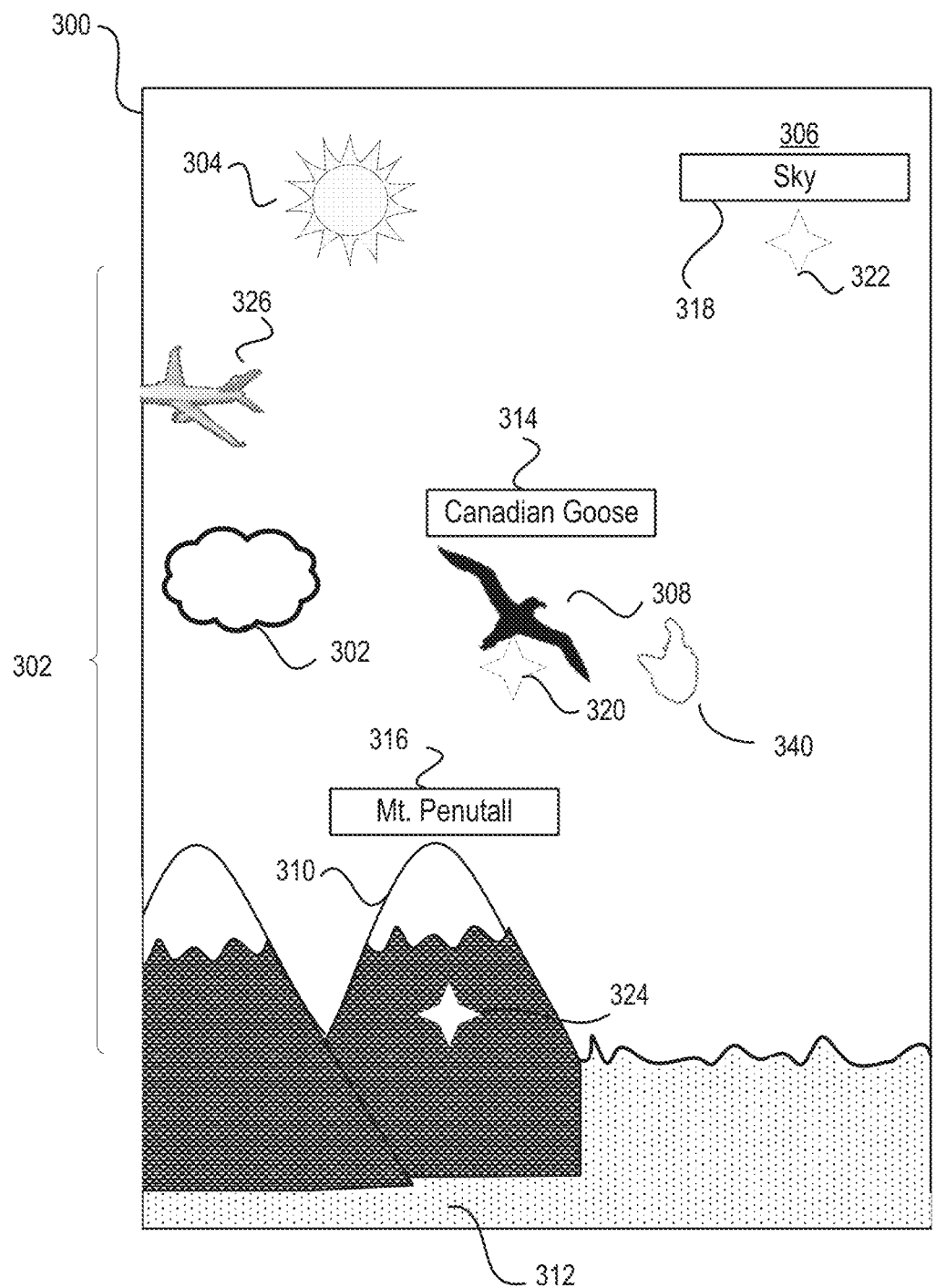

FIG. 3C illustrates a third example scenario, according to an embodiment of the present technology. In this scenario, presentation of the first media content item 302 to the user has proceeded from presentation of the first media content item 302 shown in FIG. 3A. As the presentation of the first media content item 302 proceeds, the positions of the concepts reflected therein change. The media content transitions module 102 tracks motion trajectories of the concepts in the first media content item 302. Based on the tracking, the media content transitions module 102 can present tags and transition markers for the concepts in the first media content item 302 in a manner that follows the motion trajectory of the concepts. For example, the position of the Canadian goose 308 in the first media content item 302 has changed in comparison to its position in FIG. 3A. As a result, a position of the tag 314 and a position of the transition marker 320 associated with the Canadian goose 308 have changed to follow the motion trajectory of the Canadian goose 308. Because the relative position of the sky 306 has not changed, a position of the tag 318 and a position of the transition marker 322 associated with the sky 306 have not changed.

As shown, the user has selected the transition marker 320 associated with the Canadian goose 308 through a user gesture 340. In response to the selection, the media content transitions module 102 can identify appropriate media content items from which a second media content item can be selected. Media content items reflecting a concept that is the same as or similar to the Canadian goose 308 can be determined. In addition, various data and signals, such as orientation data and social signals, can be applied to further refine the list of media content items to potentially constitute the second media content item to which the user will be transitioned. For example, media content items that are provided to the social networking system by connections of the user, liked by connections of the user, or are deemed most popular can be prioritized over other media content items. In addition, orientation data associated with the first media content item 302 can be considered in selecting a second media content item. For example, media content items that are associated with orientation data that is the same as or similar to orientation data associated with the first media content item 302 within appropriate threshold difference values can be prioritized for consideration. Once a second media content item is selected, the media content transitions module 102 can configure a transition from the first media content item 302 to optimize user experience and to minimize discordance in presentation from the first media content item 302 to the second media content item.

Figure 3D:
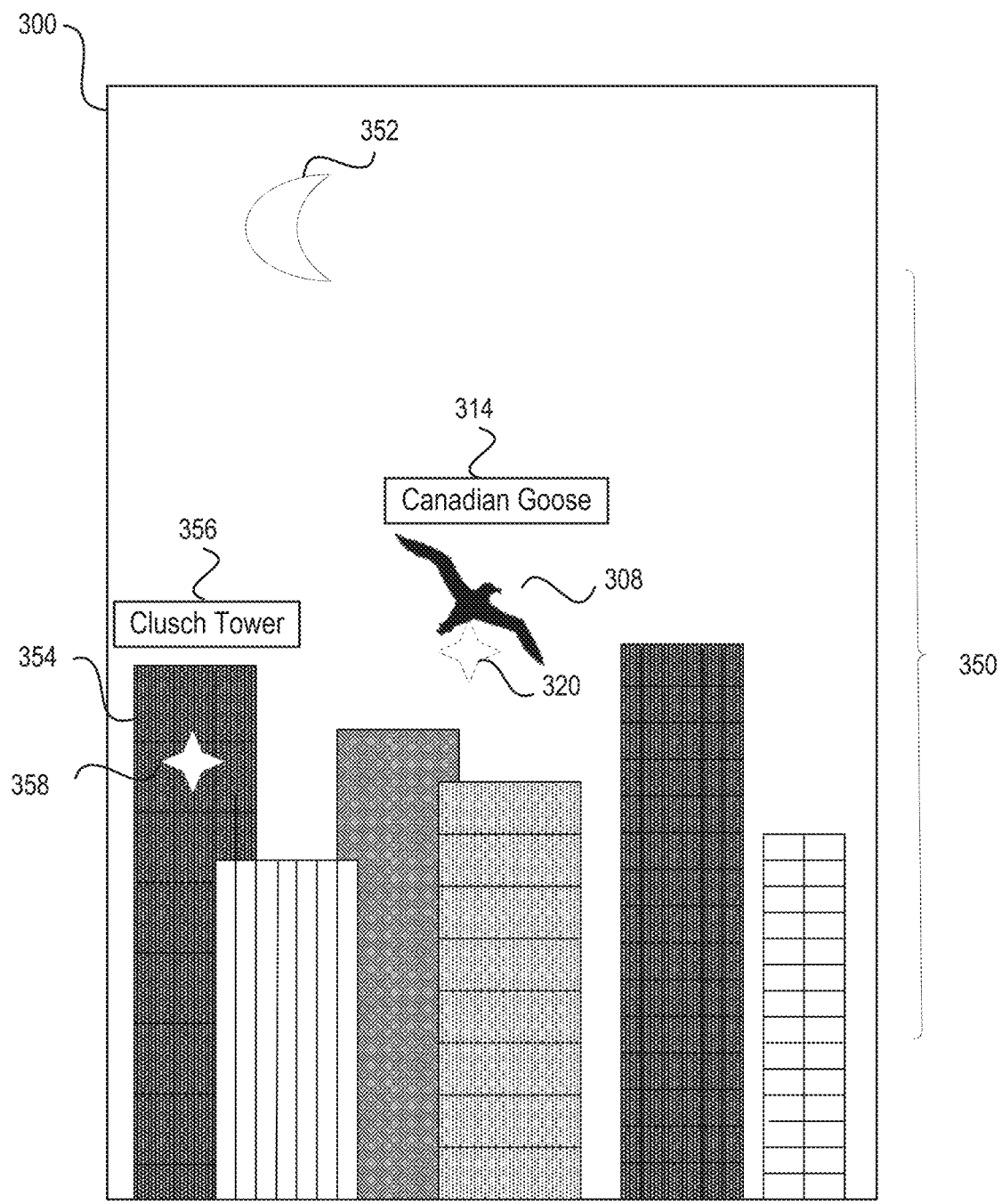

FIG. 3D illustrates a fourth example scenario, according to an embodiment of the present technology. In this scenario, a second media content item 350 has been selected in response to selection by the user of the transition marker 320 in FIG. 3C. As shown, the second media content item 350 reflects the same concept as the concept selected in the first media content item 302, namely the Canadian goose 308. Further, as shown, the orientation data associated with the second media content item 350 in relation to the Canadian goose 308 is the same as or similar to the orientation data of the first media content item 302 in relation to the Canadian goose 308 within appropriate threshold difference values. The orientation data can include, for example, a translational velocity and a rotational velocity of one or more cameras in relation to capture of the Canadian goose 308.

New concepts are reflected in the second media content item 350. As shown, a skyscraper 354 and a moon 352 have been identified as concepts reflected in the second media content item 350. Because the skyscraper 354 has been determined to be relevant to the interests of the user, a tag 356 and a transition marker 358 associated with the skyscraper 354 are presented. If the user wishes to access additional content reflecting the concept of the skyscraper 354, the user can select the transition marker 358 to transition to another media content item reflecting that concept. No tag or transition marker associated with the moon 352 is presented in the second media content item 350 because it has been determined that the concept of the moon 352 does not satisfy a threshold level of relevance to the interests of the user.

Figure 3E:
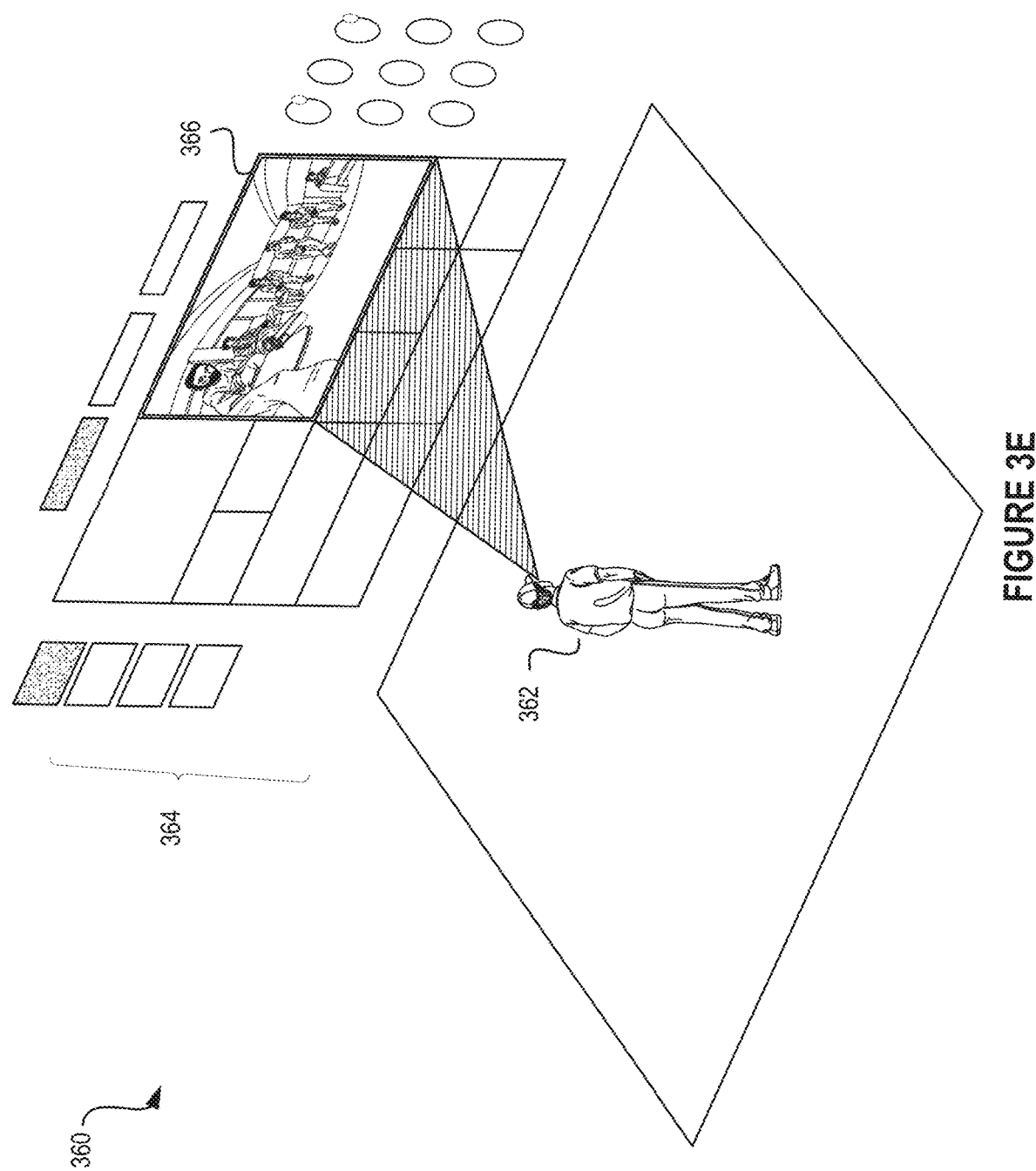

FIG. 3E illustrates a fifth example scenario 360, according to an embodiment of the present technology. In the scenario 360, a user is experiencing a VR environment providing an immersive experience for the user. The user is presented as an avatar 362. In the VR environment, the avatar 362 of the user can view a variety of types of media content items, such as thumbnail images, 2D images, panoramic images, 360 photos, 2D videos, 360 videos, etc. A collection 364 of media content items is selectable by the user. The user can select a media content item from the collection 364 by an appropriate user command or gesture. As shown, the user has selected a particular media content item 366 from the collection 364 by gazing at the media content item 366 for a predetermined duration. For example, the media content item 366 can be a 2D image. In response to selection by the user of the media content item 366, a transition can be executed that causes presentation of a different, second media content item to the user in the VR environment. The second media content item, which can be an adaptation of the first media content item, can provide a more immersive experience to the user as compared to the first media content item. For example, as shown in FIG. 3F, a second media content item adapted from a first media content item can be presented to a user as a 360 degree experience, such as a photo sphere or other virtual content, that surrounds the user.

Figure 3F:
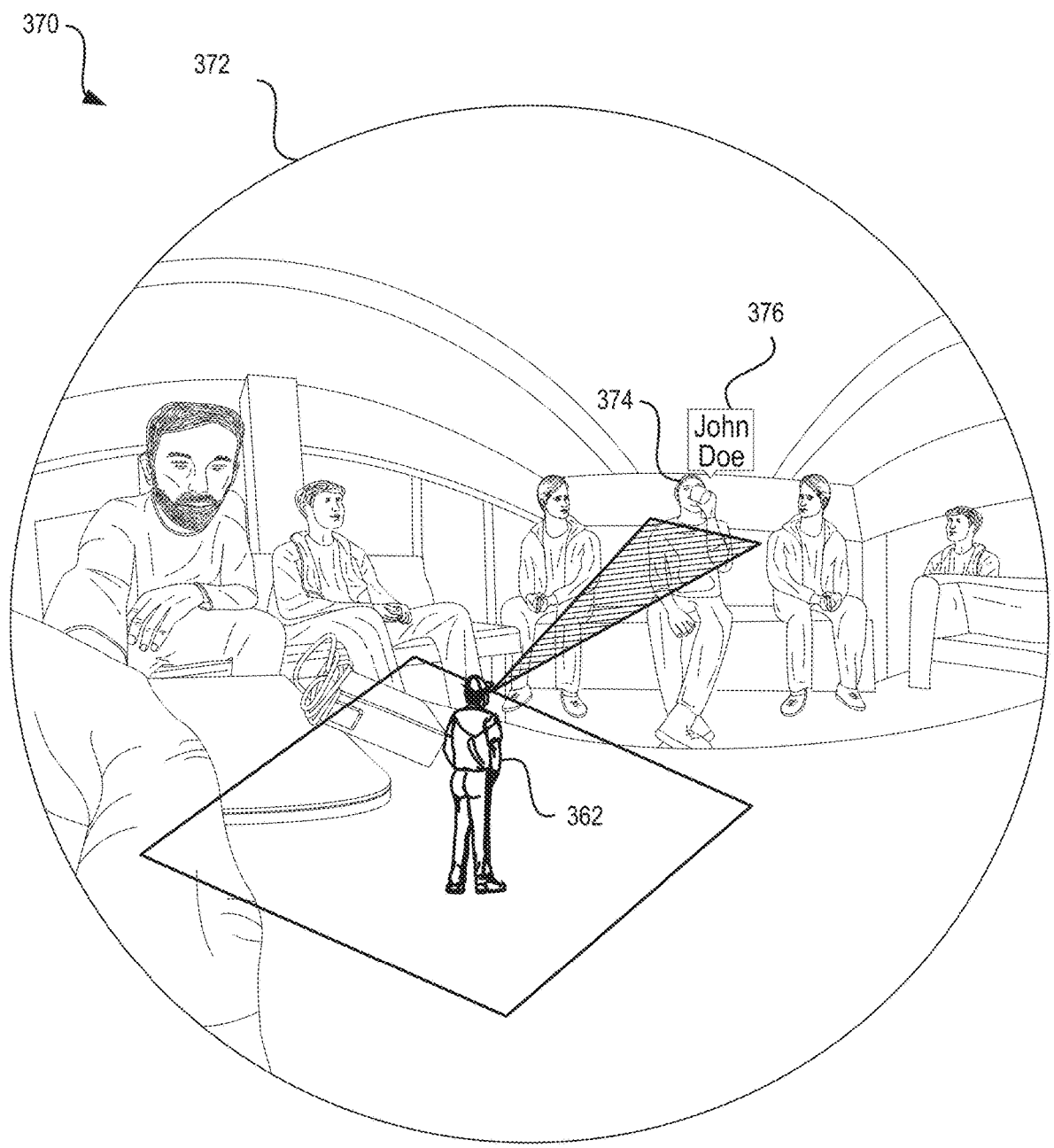

FIG. 3F illustrates a sixth example scenario 370, according to an embodiment of the present technology. In the scenario 370, the user is experiencing a VR environment to which the user has been transitioned (or teleported, tunneled, jumped, etc.) from the scenario 360 in FIG. 3E. In this regard, presentation of the media content item 366 to the user in the scenario 360 in FIG. 3E has transitioned to presentation of a media content item 372 to the user. As shown, the media content item 372 can be a 3D media content item, such as a 360 image, that provides an immersive experience for the user. The user can view and select concepts depicted in the media content item 372. The user can select a concept depicted in the media content item 372 by an appropriate user command or gesture. The selection of the concept can cause an identifier of the concept, such as a tag, to be presented in the media content item 372 and can cause a resulting transition to another scenario. As shown, a person 374 can be depicted in the media content item 372. The user can select the person 374 by gazing at the person 374 for a predetermined first duration. The selection of the person 374 can cause a tag 376 identifying the person 374 to be presented in the media content item 372. By indicating a desire to transition in relation to the person 374, the user can be transitioned so that the user is presented with a destination in the VR environment associated with the person 374. For example, the desire to transition can be indicated by gazing at the person 374 for a predetermined second duration. The destination can be, for example, a location, resource, or other profile or portal in the VR environment associated with the person 374, as shown in FIG. 3G.

Figure 3G:
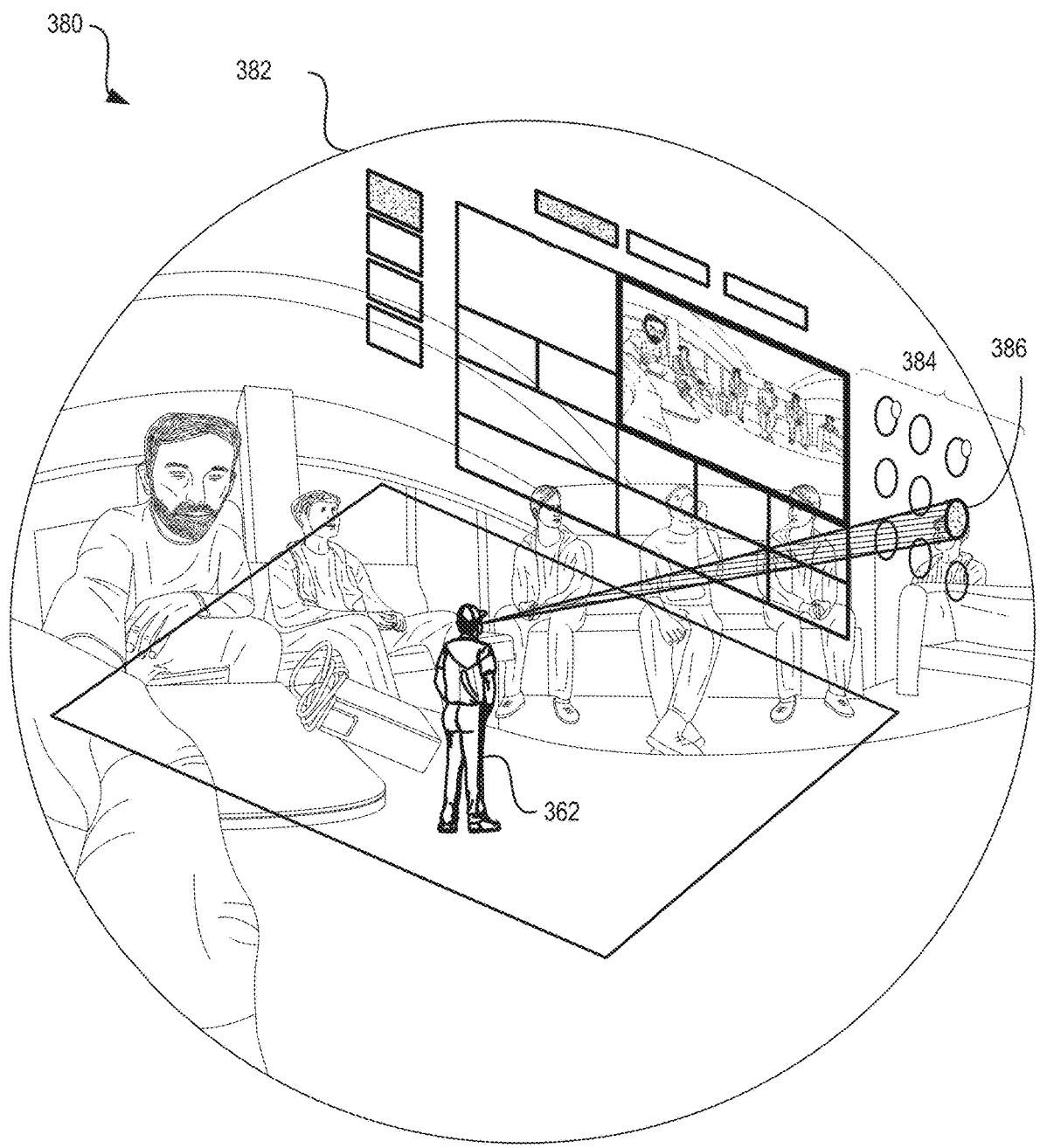

FIG. 3G illustrates a seventh example scenario 380, according to an embodiment of the present technology. In the scenario 380, presentation of the media content item 372 in FIG. 3F has transitioned to presentation of a media content item 382 in a VR environment that provides an immersive experience for the user. In this regard, selection by the user of the person 374 in the scenario 370 in FIG. 3F caused the user to be transitioned so that the user is presented with a profile or portal in the VR environment associated with the person 374. The profile or portal can include information relating to a presence and interactions of the person 374 in the VR environment. For example, the profile or portal can include a collection 384 of connections (e.g., friends) of the person 374 in the VR environment. The collection 384 of connections of the person 374 can be represented by, for example, images, thumbnails, or avatars of the connections. The user can select an avatar 386 of a first connection of the person 374 from the collection 384. The selection can be performed by an appropriate user command or gesture, such as gazing at the first connection for a predetermined duration. In response to selection of the first connection, the user can be transitioned so that the user is presented with a profile or portal of the first connection in the VR environment. In a similar manner, the user can select an avatar of a second connection in the profile or portal of the first connection and be transitioned in a manner such that a profile or portal of the second connection is presented to the user. Any sequence or number of transitions to profiles or portals of various persons or other destinations in the VR environment can be performed in this manner by the user.

Figure 4A:
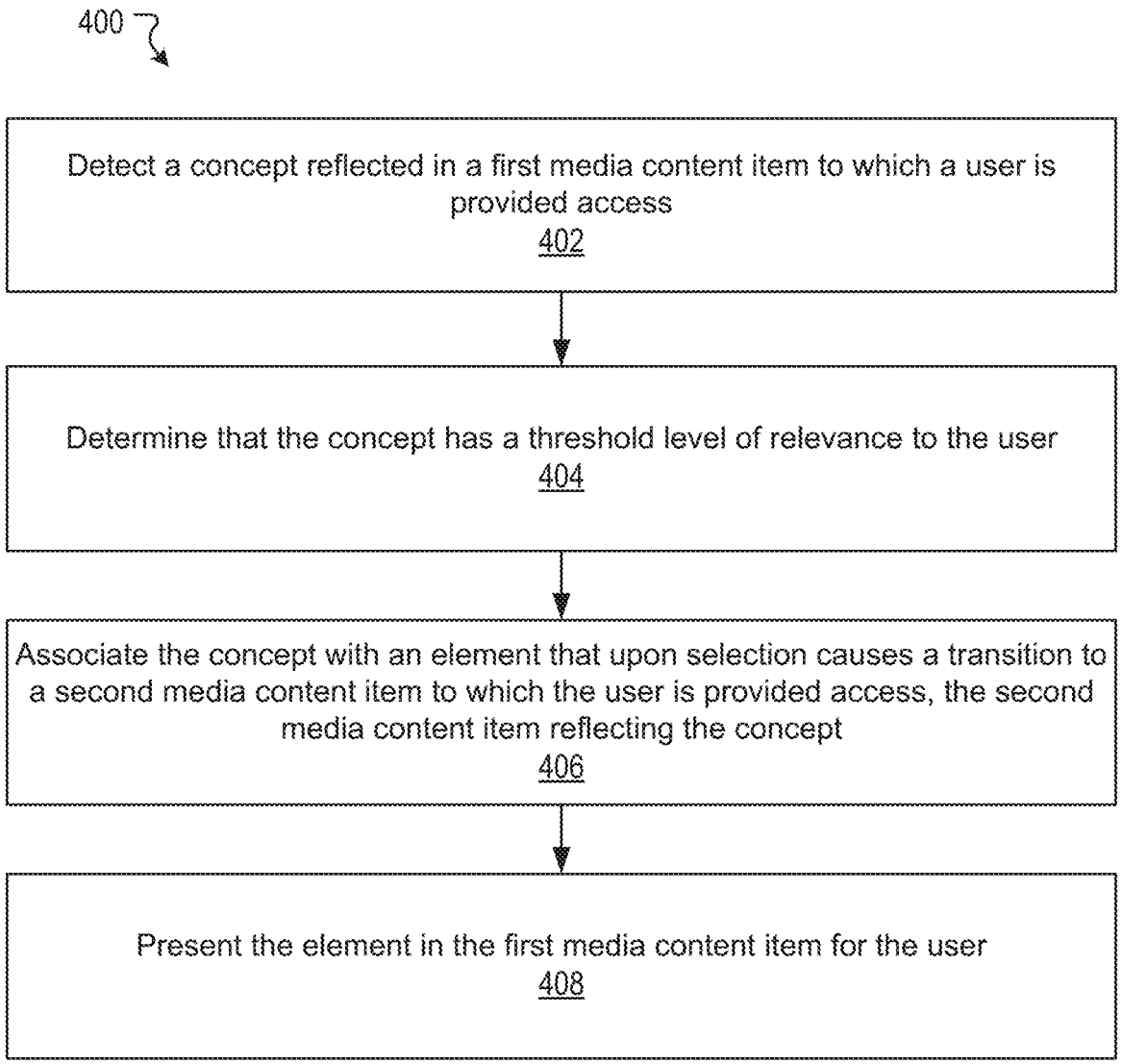
FIG. 4A illustrates an example method relating to tagging and metadata, according to an embodiment of the present technology.

FIG. 4A illustrates an example method 400 relating to tagging and metadata, according to an embodiment of the present technology. It should be appreciated that there can be additional, fewer, or alternative steps performed in similar or alternative orders, or in parallel, in accordance with the various embodiments and features discussed herein unless otherwise stated.

At block 402, the method 400 can detect a concept reflected in a first media content item to which a user is provided access. At block 404, the method 400 can determine that the concept has a threshold level of relevance to the user. At block 406, the method 400 can associate the concept with an element that upon selection causes a transition to a second media content item to which the user is provided access, the second media content item reflecting the concept. At block 408, the method 400 can present the element in the first media content item for the user. Other suitable techniques that incorporate various features and embodiments of the present technology are possible.

FIG. 4B illustrates an example method 450 relating to content transitions, according to an embodiment of the present technology. It should be appreciated that there can be additional, fewer, or alternative steps performed in similar or alternative orders, or in parallel, in accordance with the various embodiments and features discussed herein unless otherwise stated.

At block 452, the method 450 can receive from a user a selection associated with a first media content item to cause a transition from the first media content item. At block 454, the method 450 can configure a transition between the first media content item and a second media content item. At block 456, the method 450 can present the transition for the user in response to the selection. Other suitable techniques that incorporate various features and embodiments of the present technology are possible.

Figure 5:
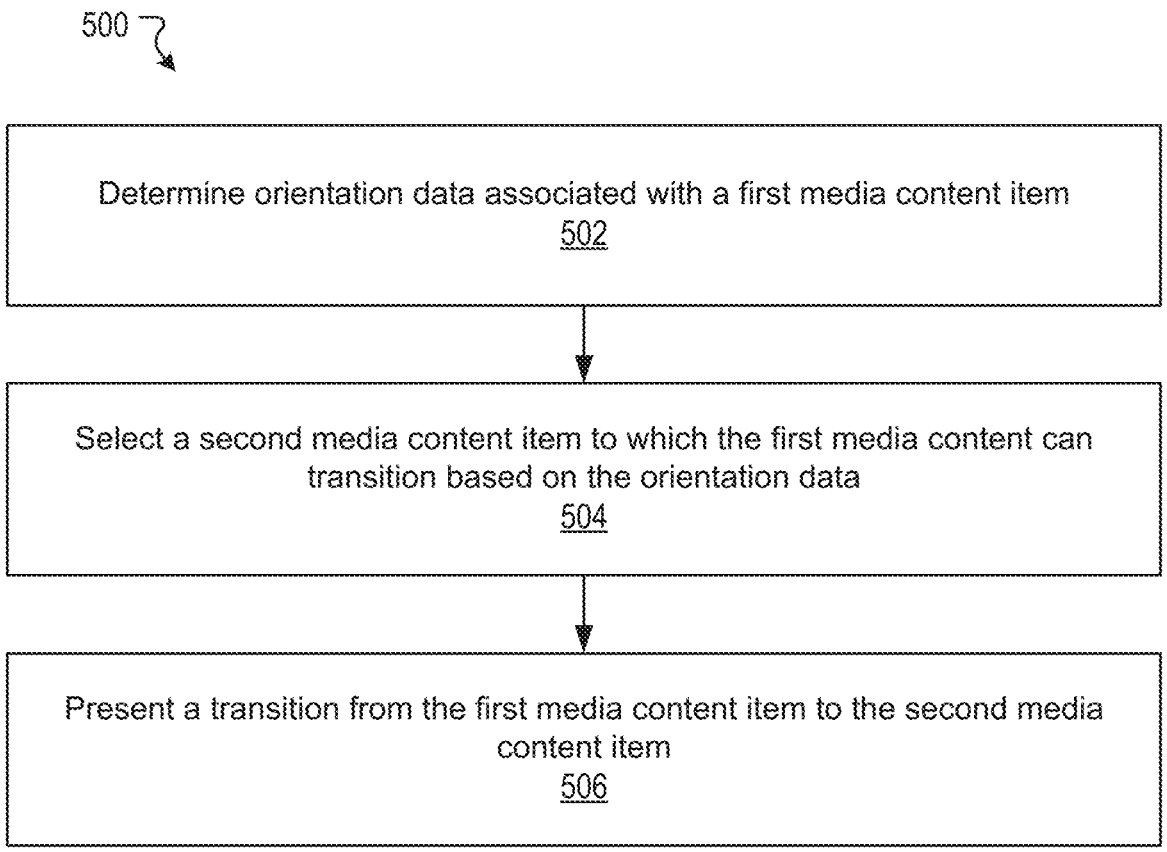
FIG. 5 illustrates an example method relating to transition matching, according to an embodiment of the present technology.

FIG. 5 illustrates an example method 500 relating to transitions matching, according to an embodiment of the present technology. It should be appreciated that there can be additional, fewer, or alternative steps performed in similar or alternative orders, or in parallel, in accordance with the various embodiments and features discussed herein unless otherwise stated.

At block 502, the method 500 can determine orientation data associated with a first media content item. At block 504, the method 500 can select a second media content item to which the first media content can transition based on the orientation data. At block 506, the method 500 can present a transition from the first media content item to the second media content item. Other suitable techniques that incorporate various features and embodiments of the present technology are possible.

It is contemplated that there can be many other uses, applications, features, possibilities, and variations associated with various embodiments of the present technology. For example, users can choose whether or not to opt-in to utilize the present technology. The present technology also can ensure that various privacy settings, preferences, and configurations are maintained and can prevent private information from being divulged. In another example, various embodiments of the present technology can learn, improve, and be refined over time.

Social Networking System—Example Implementation

Figure 6:
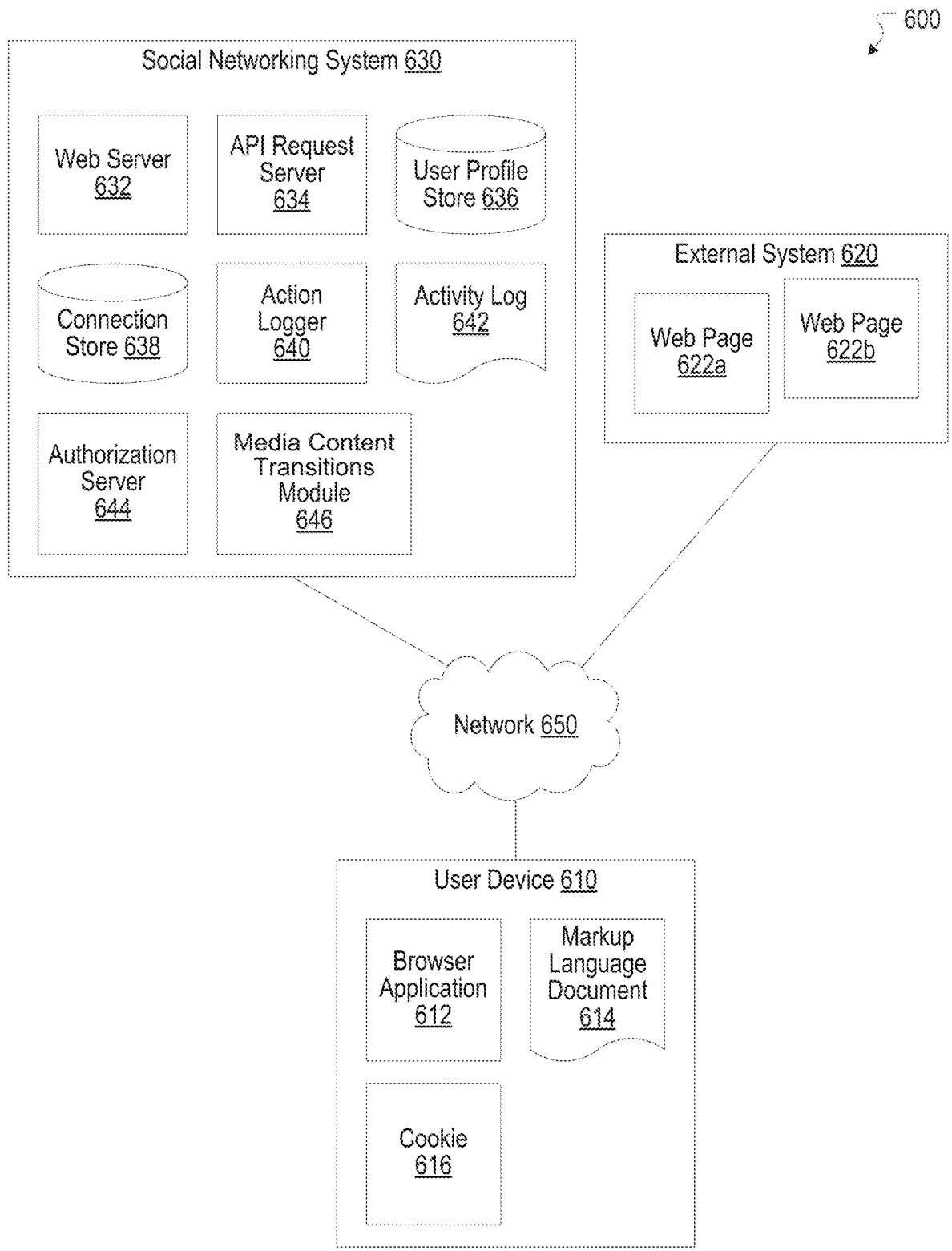
FIG. 6 illustrates a network diagram of an example system that can be utilized in various scenarios, according to an embodiment of the present technology.

FIG. 6 illustrates a network diagram of an example system 600 that can be utilized in various scenarios, in accordance with an embodiment of the present technology. The system 600 includes one or more user devices 610, one or more external systems 620, a social networking system (or service) 630, and a network 655. In an embodiment, the social networking service, provider, and/or system discussed in connection with the embodiments described above may be implemented as the social networking system 630. For purposes of illustration, the embodiment of the system 600, shown by FIG. 6, includes a single external system 620 and a single user device 610. However, in other embodiments, the system 600 may include more user devices 610 and/or more external systems 620. In certain embodiments, the social networking system 630 is operated by a social network provider, whereas the external systems 620 are separate from the social networking system 630 in that they may be operated by different entities. In various embodiments, however, the social networking system 630 and the external systems 620 operate in conjunction to provide social networking services to users (or members) of the social networking system 630. In this sense, the social networking system 630 provides a platform or backbone, which other systems, such as external systems 620, may use to provide social networking services and functionalities to users across the Internet.

The user device 610 comprises one or more computing devices that can receive input from a user and transmit and receive data via the network 655. In one embodiment, the user device 610 is a conventional computer system executing, for example, a Microsoft Windows compatible operating system (OS), Apple OS X, and/or a Linux distribution. In another embodiment, the user device 610 can be a device having computer functionality, such as a smart-phone, a tablet, a personal digital assistant (PDA), a mobile telephone, etc. The user device 610 is configured to communicate via the network 655. The user device 610 can execute an application, for example, a browser application that allows a user of the user device 610 to interact with the social networking system 630. In another embodiment, the user device 610 interacts with the social networking system 630 through an application programming interface (API) provided by the native operating system of the user device 610, such as iOS and ANDROID. The user device 610 is configured to communicate with the external system 620 and the social networking system 630 via the network 655, which may comprise any combination of local area and/or wide area networks, using wired and/or wireless communication systems.

In one embodiment, the network 655 uses standard communications technologies and protocols. Thus, the network 655 can include links using technologies such as Ethernet, 802.11, worldwide interoperability for microwave access (WiMAX), 3G, 4G, CDMA, GSM, LTE, digital subscriber line (DSL), etc. Similarly, the networking protocols used on the network 655 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the network 655 can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec).

In one embodiment, the user device 610 may display content from the external system 620 and/or from the social networking system 630 by processing a markup language document 614 received from the external system 620 and from the social networking system 630 using a browser application 612. The markup language document 614 identifies content and one or more instructions describing formatting or presentation of the content. By executing the instructions included in the markup language document 614, the browser application 612 displays the identified content using the format or presentation described by the markup language document 614. For example, the markup language document 614 includes instructions for generating and displaying a web page having multiple frames that include text and/or image data retrieved from the external system 620 and the social networking system 630. In various embodiments, the markup language document 614 comprises a data file including extensible markup language (XML) data, extensible hypertext markup language (XHTML) data, or other markup language data. Additionally, the markup language document 614 may include JavaScript Object Notation (JSON) data, JSON with padding (JSONP), and JavaScript data to facilitate data-interchange between the external system 620 and the user device 610. The browser application 612 on the user device 610 may use a JavaScript compiler to decode the markup language document 614.

The markup language document 614 may also include, or link to, applications or application frameworks such as FLASH™ or Unity™ applications, the SilverLight™ application framework, etc.

In one embodiment, the user device 610 also includes one or more cookies 616 including data indicating whether a user of the user device 610 is logged into the social networking system 630, which may enable modification of the data communicated from the social networking system 630 to the user device 610.

The external system 620 includes one or more web servers that include one or more web pages 622a, 622b, which are communicated to the user device 610 using the network 655. The external system 620 is separate from the social networking system 630. For example, the external system 620 is associated with a first domain, while the social networking system 630 is associated with a separate social networking domain. Web pages 622a, 622b, included in the external system 620, comprise markup language documents 614 identifying content and including instructions specifying formatting or presentation of the identified content.

The social networking system 630 includes one or more computing devices for a social network, including a plurality of users, and providing users of the social network with the ability to communicate and interact with other users of the social network. In some instances, the social network can be represented by a graph, i.e., a data structure including edges and nodes. Other data structures can also be used to represent the social network, including but not limited to databases, objects, classes, meta elements, files, or any other data structure. The social networking system 630 may be administered, managed, or controlled by an operator. The operator of the social networking system 630 may be a human being, an automated application, or a series of applications for managing content, regulating policies, and collecting usage metrics within the social networking system 630. Any type of operator may be used.

Users may join the social networking system 630 and then add connections to any number of other users of the social networking system 630 to whom they desire to be connected. As used herein, the term "friend" refers to any other user of the social networking system 630 to whom a user has formed a connection, association, or relationship via the social networking system 630. For example, in an embodiment, if users in the social networking system 630 are represented as nodes in the social graph, the term "friend" can refer to an edge formed between and directly connecting two user nodes.

Connections may be added explicitly by a user or may be automatically created by the social networking system 630 based on common characteristics of the users (e.g., users who are alumni of the same educational institution). For example, a first user specifically selects a particular other user to be a friend. Connections in the social networking system 630 are usually in both directions, but need not be, so the terms "user" and "friend" depend on the frame of reference. Connections between users of the social networking system 630 are usually bilateral ("two-way"), or "mutual," but connections may also be unilateral, or "one-way." For example, if Bob and Joe are both users of the social networking system 630 and connected to each other, Bob and Joe are each other's connections. If, on the other hand, Bob wishes to connect to Joe to view data communicated to the social networking system 630 by Joe, but Joe does not wish to form a mutual connection, a unilateral connection may be established. The connection between users may be a direct connection; however, some embodiments of the social networking system 630 allow the connection to be indirect via one or more levels of connections or degrees of separation.

In addition to establishing and maintaining connections between users and allowing interactions between users, the social networking system 630 provides users with the ability to take actions on various types of items supported by the social networking system 630. These items may include groups or networks (i.e., social networks of people, entities, and concepts) to which users of the social networking system 630 may belong, events or calendar entries in which a user might be interested, computer-based applications that a user may use via the social networking system 630, transactions that allow users to buy or sell items via services provided by or through the social networking system 630, and interactions with advertisements that a user may perform on or off the social networking system 630. These are just a few examples of the items upon which a user may act on the social networking system 630, and many others are possible. A user may interact with anything that is capable of being represented in the social networking system 630 or in the external system 620, separate from the social networking system 630, or coupled to the social networking system 630 via the network 655.

The social networking system 630 is also capable of linking a variety of entities. For example, the social networking system 630 enables users to interact with each other as well as external systems 620 or other entities through an API, a web service, or other communication channels. The social networking system 630 generates and maintains the "social graph" comprising a plurality of nodes interconnected by a plurality of edges. Each node in the social graph may represent an entity that can act on another node and/or that can be acted on by another node. The social graph may include various types of nodes. Examples of types of nodes include users, non-person entities, content items, web pages, groups, activities, messages, concepts, and any other things that can be represented by an object in the social networking system 630. An edge between two nodes in the social graph may represent a particular kind of connection, or association, between the two nodes, which may result from node relationships or from an action that was performed by one of the nodes on the other node. In some cases, the edges between nodes can be weighted. The weight of an edge can represent an attribute associated with the edge, such as a strength of the connection or association between nodes. Different types of edges can be provided with different weights. For example, an edge created when one user "likes" another user may be given one weight, while an edge created when a user befriends another user may be given a different weight.

As an example, when a first user identifies a second user as a friend, an edge in the social graph is generated connecting a node representing the first user and a second node representing the second user. As various nodes relate or interact with each other, the social networking system 630 modifies edges connecting the various nodes to reflect the relationships and interactions.

The social networking system 630 also includes user-generated content, which enhances a user's interactions with the social networking system 630. User-generated content may include anything a user can add, upload, send, or "post" to the social networking system 630. For example, a user communicates posts to the social networking system 630 from a user device 610. Posts may include data such as status updates or other textual data, location information, images such as photos, videos, links, music or other similar data and/or media. Content may also be added to the social networking system 630 by a third party. Content "items" are represented as objects in the social networking system 630. In this way, users of the social networking system 630 are encouraged to communicate with each other by posting text and content items of various types of media through various communication channels. Such communication increases the interaction of users with each other and increases the frequency with which users interact with the social networking system 630.

The social networking system 630 includes a web server 632, an API request server 634, a user profile store 636, a connection store 638, an action logger 640, an activity log 642, and an authorization server 644. In an embodiment of the invention, the social networking system 630 may include additional, fewer, or different components for various applications. Other components, such as network interfaces, security mechanisms, load balancers, failover servers, management and network operations consoles, and the like are not shown so as to not obscure the details of the system.

The user profile store 636 maintains information about user accounts, including biographic, demographic, and other types of descriptive information, such as work experience, educational history, hobbies or preferences, location, and the like that has been declared by users or inferred by the social networking system 630. This information is stored in the user profile store 636 such that each user is uniquely identified. The social networking system 630 also stores data describing one or more connections between different users in the connection store 638. The connection information may indicate users who have similar or common work experience, group memberships, hobbies, or educational history. Additionally, the social networking system 630 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed. Connections with other nodes in the social networking system 630, such as non-person entities, buckets, cluster centers, images, interests, pages, external systems, concepts, and the like are also stored in the connection store 638.

The social networking system 630 maintains data about objects with which a user may interact. To maintain this data, the user profile store 636 and the connection store 638 store instances of the corresponding type of objects maintained by the social networking system 630. Each object type has information fields that are suitable for storing information appropriate to the type of object. For example, the user profile store 636 contains data structures with fields suitable for describing a user's account and information related to a user's account. When a new object of a particular type is created, the social networking system 630 initializes a new data structure of the corresponding type, assigns a unique object identifier to it, and begins to add data to the object as needed. This might occur, for example, when a user becomes a user of the social networking system 630, the social networking system 630 generates a new instance of a user profile in the user profile store 636, assigns a unique identifier to the user account, and begins to populate the fields of the user account with information provided by the user.

The connection store 638 includes data structures suitable for describing a user's connections to other users, connections to external systems 620 or connections to other entities. The connection store 638 may also associate a connection type with a user's connections, which may be used in conjunction with the user's privacy setting to regulate access to information about the user. In an embodiment of the invention, the user profile store 636 and the connection store 638 may be implemented as a federated database.

Data stored in the connection store 638, the user profile store 636, and the activity log 642 enables the social networking system 630 to generate the social graph that uses nodes to identify various objects and edges connecting nodes to identify relationships between different objects. For example, if a first user establishes a connection with a second user in the social networking system 630, user accounts of the first user and the second user from the user profile store 636 may act as nodes in the social graph. The connection between the first user and the second user stored by the connection store 638 is an edge between the nodes associated with the first user and the second user. Continuing this example, the second user may then send the first user a message within the social networking system 630. The action of sending the message, which may be stored, is another edge between the two nodes in the social graph representing the first user and the second user. Additionally, the message itself may be identified and included in the social graph as another node connected to the nodes representing the first user and the second user.

In another example, a first user may tag a second user in an image that is maintained by the social networking system 630 (or, alternatively, in an image maintained by another system outside of the social networking system 630). The image may itself be represented as a node in the social networking system 630. This tagging action may create edges between the first user and the second user as well as create an edge between each of the users and the image, which is also a node in the social graph. In yet another example, if a user confirms attending an event, the user and the event are nodes obtained from the user profile store 636, where the attendance of the event is an edge between the nodes that may be retrieved from the activity log 642. By generating and maintaining the social graph, the social networking system 630 includes data describing many different types of objects and the interactions and connections among those objects, providing a rich source of socially relevant information.

The web server 632 links the social networking system 630 to one or more user devices 610 and/or one or more external systems 620 via the network 655. The web server 632 serves web pages, as well as other web-related content, such as Java, JavaScript, Flash, XML, and so forth. The web server 632 may include a mail server or other messaging functionality for receiving and routing messages between the social networking system 630 and one or more user devices 610. The messages can be instant messages, queued messages (e.g., email), text and SMS messages, or any other suitable messaging format.

The API request server 634 allows one or more external systems 620 and user devices 610 to call access information from the social networking system 630 by calling one or more API functions. The API request server 634 may also allow external systems 620 to send information to the social networking system 630 by calling APIs. The external system 620, in one embodiment, sends an API request to the social networking system 630 via the network 655, and the API request server 634 receives the API request. The API request server 634 processes the request by calling an API associated with the API request to generate an appropriate response, which the API request server 634 communicates to the external system 620 via the network 655. For example, responsive to an API request, the API request server 634 collects data associated with a user, such as the user's connections that have logged into the external system 620, and communicates the collected data to the external system 620. In another embodiment, the user device 610 communicates with the social networking system 630 via APIs in the same manner as external systems 620.

The action logger 640 is capable of receiving communications from the web server 632 about user actions on and/or off the social networking system 630. The action logger 640 populates the activity log 642 with information about user actions, enabling the social networking system 630 to discover various actions taken by its users within the social networking system 630 and outside of the social networking system 630. Any action that a particular user takes with respect to another node on the social networking system 630 may be associated with each user's account, through information maintained in the activity log 642 or in a similar database or other data repository. Examples of actions taken by a user within the social networking system 630 that are identified and stored may include, for example, adding a connection to another user, sending a message to another user, reading a message from another user, viewing content associated with another user, attending an event posted by another user, posting an image, attempting to post an image, or other actions interacting with another user or another object. When a user takes an action within the social networking system 630, the action is recorded in the activity log 642. In one embodiment, the social networking system 630 maintains the activity log 642 as a database of entries. When an action is taken within the social networking system 630, an entry for the action is added to the activity log 642. The activity log 642 may be referred to as an action log.

Additionally, user actions may be associated with concepts and actions that occur within an entity outside of the social networking system 630, such as an external system 620 that is separate from the social networking system 630. For example, the action logger 640 may receive data describing a user's interaction with an external system 620 from the web server 632. In this example, the external system 620 reports a user's interaction according to structured actions and objects in the social graph.

Other examples of actions where a user interacts with an external system 620 include a user expressing an interest in an external system 620 or another entity, a user posting a comment to the social networking system 630 that discusses an external system 620 or a web page 622*a* within the external system 620, a user posting to the social networking system 630 a Uniform Resource Locator (URL) or other identifier associated with an external system 620, a user attending an event associated with an external system 620, or any other action by a user that is related to an external system 620. Thus, the activity log 642 may include actions describing interactions between a user of the social networking system 630 and an external system 620 that is separate from the social networking system 630.

The authorization server 644 enforces one or more privacy settings of the users of the social networking system 630. A privacy setting of a user determines how particular information associated with a user can be shared. The privacy setting comprises the specification of particular information associated with a user and the specification of the entity or entities with whom the information can be shared. Examples of entities with which information can be shared may include other users, applications, external systems 620, or any entity that can potentially access the information. The information that can be shared by a user comprises user account information, such as profile photos, phone numbers associated with the user, user's connections, actions taken by the user such as adding a connection, changing user profile information, and the like.

The privacy setting specification may be provided at different levels of granularity. For example, the privacy setting may identify specific information to be shared with other users; the privacy setting identifies a work phone number or a specific set of related information, such as, personal information including profile photo, home phone number, and status. Alternatively, the privacy setting may apply to all the information associated with the user. The specification of the set of entities that can access particular information can also be specified at various levels of granularity. Various sets of entities with which information can be shared may include, for example, all friends of the user, all friends of friends, all applications, or all external systems 620. One embodiment allows the specification of the set of entities to comprise an enumeration of entities. For example, the user may provide a list of external systems 620 that are allowed to access certain information. Another embodiment allows the specification to comprise a set of entities along with exceptions that are not allowed to access the information. For example, a user may allow all external systems 620 to access the user's work information, but specify a list of external systems 620 that are not allowed to access the work information. Certain embodiments call the list of exceptions that are not allowed to access certain information a "block list". External systems 620 belonging to a block list specified by a user are blocked from accessing the information specified in the privacy setting. Various combinations of granularity of specification of information, and granularity of specification of entities, with which information is shared are possible. For example, all personal information may be shared with friends whereas all work information may be shared with friends of friends.

The authorization server 644 contains logic to determine if certain information associated with a user can be accessed by a user's friends, external systems 620, and/or other applications and entities. The external system 620 may need authorization from the authorization server 644 to access the user's more private and sensitive information, such as the user's work phone number. Based on the user's privacy settings, the authorization server 644 determines if another user, the external system 620, an application, or another entity is allowed to access information associated with the user, including information about actions taken by the user.

In some embodiments, the social networking system 630 can include a media content transitions module 646. The media content transitions module 646 can be implemented with the media content transitions module 102, as discussed in more detail herein. In some embodiments, one or more functionalities of the media content transitions module 646 can be implemented in the user device 610.

Hardware Implementation

Figure 7:
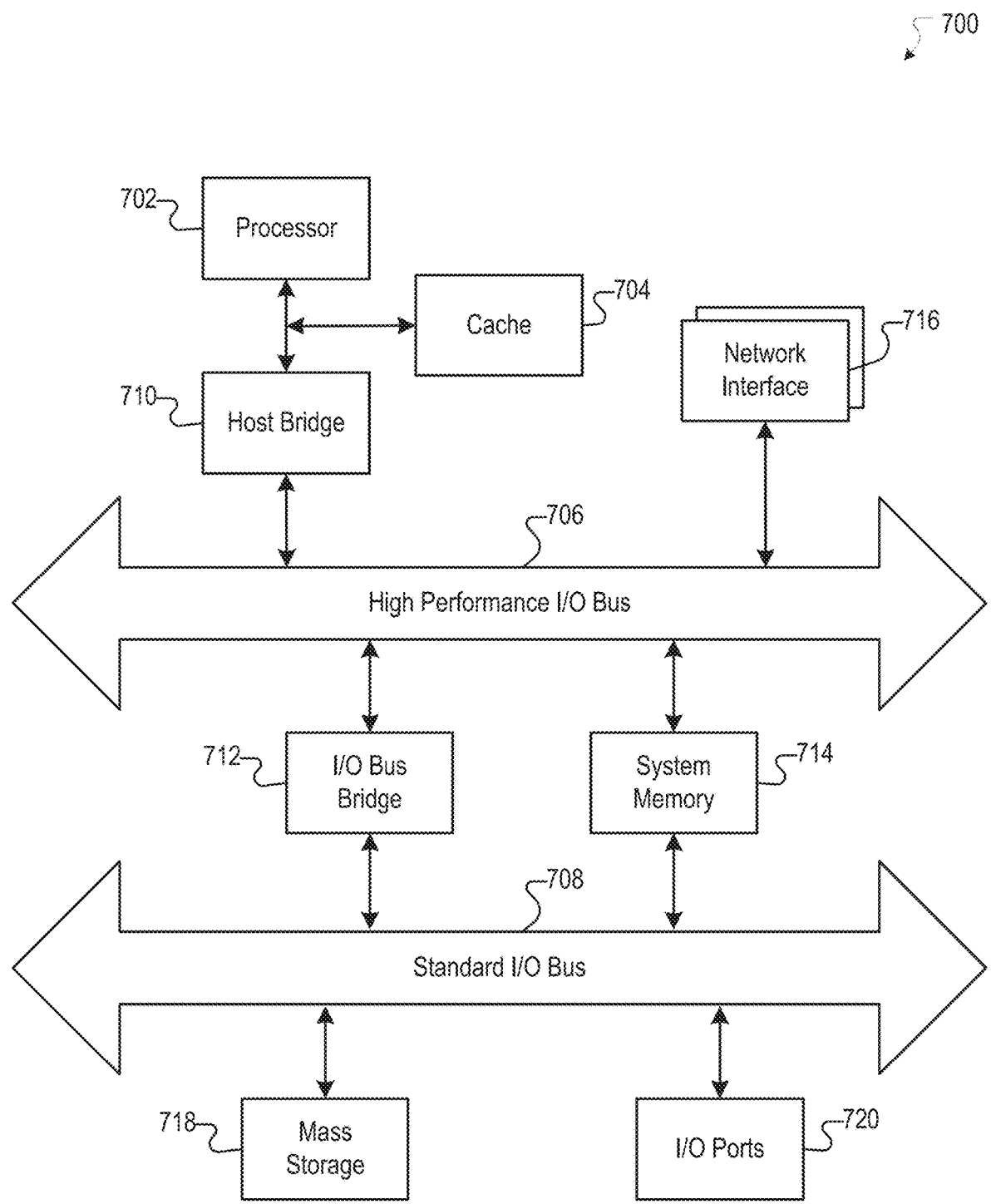
FIG. 7 illustrates an example of a computer system that can be utilized in various scenarios, according to an embodiment of the present technology.

The foregoing processes and features can be implemented by a wide variety of machine and computer system architectures and in a wide variety of network and computing environments. FIG. 7 illustrates an example of a computer system 700 that may be used to implement one or more of the embodiments described herein in accordance with an embodiment of the invention. The computer system 700 includes sets of instructions for causing the computer system 700 to perform the processes and features discussed herein. The computer system 700 may be connected (e.g., networked) to other machines. In a networked deployment, the computer system 700 may operate in the capacity of a server machine or a client machine in a client-server network environment, or as a peer machine in a peer-to-peer (or distributed) network environment. In an embodiment of the invention, the computer system 700 may be the social networking system 630, the user device 610, and the external system 720, or a component thereof. In an embodiment of the invention, the computer system 700 may be one server among many that constitutes all or part of the social networking system 630.

The computer system 700 includes a processor 702, a cache 704, and one or more executable modules and drivers, stored on a computer-readable medium, directed to the processes and features described herein. Additionally, the computer system 700 includes a high performance input/output (I/O) bus 706 and a standard I/O bus 708. A host bridge 710 couples processor 702 to high performance I/O bus 706, whereas I/O bus bridge 712 couples the two buses 706 and 708 to each other. A system memory 714 and one or more network interfaces 716 couple to high performance I/O bus 706. The computer system 700 may further include video memory and a display device coupled to the video memory (not shown). Mass storage 718 and I/O ports 720 couple to the standard I/O bus 708. The computer system 700 may optionally include a keyboard and pointing device, a display device, or other input/output devices (not shown) coupled to the standard I/O bus 708. Collectively, these elements are intended to represent a broad category of computer hardware systems, including but not limited to computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

An operating system manages and controls the operation of the computer system 700, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Other implementations are possible.

The elements of the computer system 700 are described in greater detail below. In particular, the network interface 716 provides communication between the computer system 700 and any of a wide range of networks, such as an Ethernet (e.g., IEEE 802.3) network, a backplane, etc. The mass storage 718 provides permanent storage for the data and programming instructions to perform the above-described processes and features implemented by the respective computing systems identified above, whereas the system memory 714 (e.g., DRAM) provides temporary storage for the data and programming instructions when executed by the processor 702. The I/O ports 720 may be one or more serial and/or parallel communication ports that provide communication between additional peripheral devices, which may be coupled to the computer system 700.

The computer system 700 may include a variety of system architectures, and various components of the computer system 700 may be rearranged. For example, the cache 704 may be on-chip with processor 702. Alternatively, the cache 704 and the processor 702 may be packed together as a "processor module", with processor 702 being referred to as the "processor core". Furthermore, certain embodiments of the invention may neither require nor include all of the above components. For example, peripheral devices coupled to the standard I/O bus 708 may couple to the high performance I/O bus 706. In addition, in some embodiments, only a single bus may exist, with the components of the computer system 700 being coupled to the single bus. Moreover, the computer system 700 may include additional components, such as additional processors, storage devices, or memories.

In general, the processes and features described herein may be implemented as part of an operating system or a specific application, component, program, object, module, or series of instructions referred to as "programs". For example, one or more programs may be used to execute specific processes described herein. The programs typically comprise one or more instructions in various memory and storage devices in the computer system 700 that, when read and executed by one or more processors, cause the computer system 700 to perform operations to execute the processes and features described herein. The processes and features described herein may be implemented in software, firmware, hardware (e.g., an application specific integrated circuit), or any combination thereof.

In one implementation, the processes and features described herein are implemented as a series of executable modules run by the computer system 700, individually or collectively in a distributed computing environment. The foregoing modules may be realized by hardware, executable modules stored on a computer-readable medium (or machine-readable medium), or a combination of both. For example, the modules may comprise a plurality or series of instructions to be executed by a processor in a hardware system, such as the processor 702. Initially, the series of instructions may be stored on a storage device, such as the mass storage 718. However, the series of instructions can be stored on any suitable computer readable storage medium. Furthermore, the series of instructions need not be stored locally, and could be received from a remote storage device, such as a server on a network, via the network interface 716. The instructions are copied from the storage device, such as the mass storage 718, into the system memory 714 and then accessed and executed by the processor 702. In various implementations, a module or modules can be executed by a processor or multiple processors in one or multiple locations, such as multiple servers in a parallel processing environment.

Examples of computer-readable media include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 700 to perform any one or more of the processes and features described herein.

For purposes of explanation, numerous specific details are set forth in order to provide a thorough understanding of the description. It will be apparent, however, to one skilled in the art that embodiments of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one embodiment", "an embodiment", "other embodiments", "one series of embodiments", "some embodiments", "various embodiments", or the like means that a particular feature, design, structure, or characteristic described in connection with the embodiment is included in at least one embodiment of the disclosure. The appearances of, for example, the phrase "in one embodiment" or "in an embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments, but also variously omitted in other embodiments. Similarly, various features are described that may be preferences or requirements for some embodiments, but not other embodiments.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
   receiving, by a computing system, from a user, a selection of a transition marker associated with a concept reflected in a first media content item to cause a transition from the first media content item, wherein the transition marker follows a motion trajectory associated with the concept;
   configuring, by the computing system, a transition between the first media content item and a second media content item reflecting the concept, wherein the transition is configured based in part on orientation data of the first media content item and the second media content item being within one or more threshold difference values, wherein the orientation data is determined based in part on visual indicators of the first media content item and the second media content item in relation to the concept; and
   providing, by the computing system, the transition for the user in response to the selection.

2. The computer-implemented method of claim 1, further comprising:
   determining, by the computing system, a plurality of media content items based on a tag associated with the concept; and
   selecting, by the computing system, a media content item from the plurality of media content items as the second media content item.

3. The computer-implemented method of claim 2, wherein a type of the first media content item is at least one of an image, video, virtual content, or audio content.

4. The computer-implemented method of claim 2, wherein a type of the second media content item is at least one of an image, video, virtual content, or audio content.

5. The computer-implemented method of claim 2, wherein the determining the plurality of media content items is further based on inclusion by each of the plurality of media content items of the tag associated with the concept.

6. The computer-implemented method of claim 2, wherein the selecting the media content item from the plurality of media content items comprises:
   scoring each of the plurality of media content items based at least on one of a degree of similarity between a tag associated with a media content item and the tag associated with the concept, a level of relevance of a tag associated with a media content item to interests of the user, whether a media content item is provided by a connection of the user on a social networking system, or a popularity of a media content item in the social networking system; and
   selecting the media content item from the plurality of media content items as the second media content item based on the scoring.

7. The computer-implemented method of claim 2, further comprising:
scoring each of the plurality of media content items;
providing a threshold number of high scoring media content items of the plurality of media content items to the user as candidates for the second media content item; and
receiving from the user a selection of the second media content item from the high scoring media content items.

8. The computer-implemented method of claim 2, wherein the transition is permitted by a provider of the second media content item.

9. The computer-implemented method of claim 1, wherein the second media content item provides a more immersive experience for the user than the first media content item.

10. The computer-implemented method of claim 1, wherein the first media content item is associated with a connection of the user and is presented at a profile or portal associated with the user, and wherein the transition includes presentation of the profile or portal associated with the user transitioning to presentation of a profile or portal associated with the connection.

11. A system comprising:
at least one processor; and
a memory storing instructions that, when executed by the at least one processor, cause the system to perform:
receiving from a user, a selection of a transition marker associated with a concept reflected in a first media content item to cause a transition from the first media content item, wherein the transition marker follows a motion trajectory associated with the concept;
configuring a transition between the first media content item and a second media content item reflecting the concept, wherein the transition is configured based in part on orientation data of the first media content item and the second media content item being within one or more threshold difference values, wherein the orientation data is determined based in part on visual indicators of the first media content item and the second media content item in relation to the concept; and
providing the transition for the user in response to the selection.

12. The system of claim 11, wherein the instructions, when executed, cause the system to further perform:
determining a plurality of media content items based on a tag associated with the concept; and
selecting a media content item from the plurality of media content items as the second media content item.

13. The system of claim 12, wherein a type of the first media content item is at least one of an image, video, virtual content, or audio content.

14. The system of claim 12, wherein the determining the plurality of media content items is further based on inclusion by each of the plurality of media content items of the tag associated with the concept.

15. The system of claim 12, wherein the selecting the media content item from the plurality of media content items comprises:
scoring each of the plurality of media content items based at least on one of a degree of similarity between a tag associated with a media content item and the tag associated with the concept, a level of relevance of a tag associated with a media content item to interests of the user, whether a media content item is provided by a connection of the user on a social networking system, or a popularity of a media content item in the social networking system; and
selecting the media content item from the plurality of media content items as the second media content item based on the scoring.

16. A non-transitory computer-readable storage medium including instructions that, when executed by at least one processor of a computing system, cause the computing system to perform a method comprising:
receiving from a user, a selection of a transition marker associated with a concept reflected in a first media content item to cause a transition from the first media content item, wherein the transition marker follows a motion trajectory associated with the concept;
configuring a transition between the first media content item and a second media content item reflecting the concept, wherein the transition is configured based in part on orientation data of the first media content item and the second media content item being within one or more threshold difference values, wherein the orientation data is determined based in part on visual indicators of the first media content item and the second media content item in relation to the concept; and
providing the transition for the user in response to the selection.

17. The non-transitory computer-readable storage medium of claim 16, wherein the instructions, when executed, cause the computing system to further perform:
determining a plurality of media content items based on a tag associated with the concept; and
selecting a media content item from the plurality of media content items as the second media content item.

18. The non-transitory computer-readable storage medium of claim 17, wherein a type of the first media content item is at least one of an image, video, virtual content, or audio content.

19. The non-transitory computer-readable storage medium of claim 17, wherein the determining the plurality of media content items is further based on inclusion by each of the plurality of media content items of the tag associated with the concept.

20. The non-transitory computer-readable storage medium of claim 17, wherein the selecting the media content item from the plurality of media content items comprises:
scoring each of the plurality of media content items based at least on one of a degree of similarity between a tag associated with a media content item and the tag associated with the concept, a level of relevance of a tag associated with a media content item to interests of the user, whether a media content item is provided by a connection of the user on a social networking system, or a popularity of a media content item in the social networking system; and
selecting the media content item from the plurality of media content items as the second media content item based on the scoring.

* * * * *